US012621347B2

(12) United States Patent　　　　　(10) Patent No.:　US 12,621,347 B2

Condon　　　　　　　　　　　　　　　　　(45) Date of Patent:　　　　　May 5, 2026

(54) SYSTEMS AND METHODS FOR REAL-TIME CONTROLS FOR ENDPOINT MEDIA DEVICES

(71) Applicant: DISH Network L.L.C., Englewood, CO (US)

(72) Inventor: Caroline Elizabeth Condon, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 459 days.

(21) Appl. No.: 17/738,280

(22) Filed: May 6, 2022

(65) Prior Publication Data

US 2023/0362197 A1　　Nov. 9, 2023

(51) Int. Cl.
　　H04L 9/40　　　　(2022.01)
　　H04L 65/65　　　(2022.01)
　　H04L 65/75　　　(2022.01)

(52) U.S. Cl.
　　CPC .............. H04L 63/20 (2013.01); H04L 65/65 (2022.05)

(58) Field of Classification Search
　　CPC ........ H04L 63/20; H04L 65/65; H04L 65/765
　　See application file for complete search history.

(56) References Cited

U.S. PATENT DOCUMENTS 7,428,585 B1 * 9/2008 Owens .................. H04L 63/102
　　　　　　　　　　　　　　　　　　709/224
10,536,755 B1 * 1/2020 Neill ................ H04N 21/23424

| 11,917,235 B2 * | 2/2024 | Gupta .............. H04N 21/43079 |
|---|---|---|
| 2006/0282660 A1 * | 12/2006 | Varghese .............. G07F 7/1083 |
| | | 713/155 |
| 2009/0019492 A1 * | 1/2009 | Grasset ................... H04L 67/62 |
| | | 348/E7.071 |
| 2012/0216234 A1 * | 8/2012 | Kemp ................ H04N 21/4112 |
| | | 725/110 |
| 2013/0263231 A1 * | 10/2013 | Lautenschlager ....... H04L 63/08 |
| | | 726/4 |
| 2016/0165299 A1 * | 6/2016 | Dhiman ............. H04N 21/4112 |
| | | 725/32 |
| 2016/0300049 A1 * | 10/2016 | Guedalia ............ G06V 30/1985 |
| 2019/0044948 A1 * | 2/2019 | Beals .................... H04L 63/105 |
| 2019/0246170 A1 * | 8/2019 | Sreekanth .......... H04N 21/4532 |
| 2020/0252664 A1 * | 8/2020 | Weinraub ............. H04N 21/812 |
| 2021/0099876 A1 * | 4/2021 | Neipris ............... H04W 12/106 |

* cited by examiner

*Primary Examiner* — Andrew Suh

(74) *Attorney, Agent, or Firm* — Kilpatrick Townsend & Stockton LLP

(57)　　　　　　　ABSTRACT

Systems, media devices, machine-readable media, and methods facilitate endpoint media device controls. Data streams may be processed as each is received by devices of a local network. The data streams may facilitate presentation of audio, video, and/or textual content with an endpoint media device. For each data stream, a security protocol may be detected that applies to the data stream based on of the source, the endpoint media device, an identification of a user, and/or a time corresponding to when the data stream is being received. It may be determined, during streaming of the data stream, whether the data stream includes a particular composite specified by the security protocol. When it is determined that the data stream includes the particular composite, security operations may be performed in accordance with the security protocol.

19 Claims, 5 Drawing Sheets

SYSTEMS AND METHODS FOR REAL-TIME CONTROLS FOR ENDPOINT MEDIA DEVICES

This disclosure generally relates to media device controls, and more particularly to systems and methods for real-time controls for endpoint media devices.

BACKGROUND

The evolution of video and non-video content generation and delivery may present a number of challenges and problems for media security and control. The proliferation of video from non-traditional sources, much of it user-generated and live-generated (e.g., livestreams, YouTube, TikTok, etc.), makes up an increasing share of screen time for most, if not all, types of users. Conventional platforms typically do not provide adequate security and control that keeps up with the video and non-video content generation and delivery with sufficient monitoring, data inspection, and intervention.

Thus, there is a need for systems and methods that address the foregoing problems. This and other needs are addressed by the present disclosure.

BRIEF SUMMARY

Certain embodiments of the present disclosure relate generally to media device controls, and more particularly to systems and methods for real-time controls for endpoint media devices.

In one aspect, a media device to facilitate endpoint media device controls is disclosed. The media device may include one or more processing devices and memory communicatively coupled with and readable by the one or more processing devices and having stored therein processor-readable instructions which, when executed by the one or more processing devices, cause the one or more processing devices to perform operations including one or a combination of the following. One or more data streams may be processed as each data stream of the one or more data streams is received by one or more devices of a local network. The one or more data streams may facilitate presentation of audio, video, and/or textual content with at least one of the one or more devices of the local network that corresponds to an endpoint media device. The one or more data streams may be transmitted by a source that is external to the local network and each data stream may include a plurality of data elements. For at least one data stream of the one or more data streams, a security protocol may be detected that applies to the data stream based at least in part on one or more of the source of the data stream, the endpoint media device, an identification of a user of the endpoint media device, and/or a time corresponding to when the data stream is being received. It may be determined, during streaming of the at least one data stream, whether the at least one data stream includes a particular composite specified by the security protocol. When it is determined that the at least one data stream includes the particular composite, one or more security operations may be performed in accordance with the security protocol.

In another aspect, one or more machine-readable storage devices for storing machine-executable instructions are disclosed. The machine-executable instructions, when executed by one or more processing devices, cause the one or more processing devices to perform one or a combination of the following operations. One or more data streams may be processed as each data stream of the one or more data streams is received by one or more devices of a local network. The one or more data streams may facilitate presentation of audio, video, and/or textual content with at least one of the one or more devices of the local network that corresponds to an endpoint media device. The one or more data streams may be transmitted by a source that is external to the local network and each data stream may include a plurality of data elements. For at least one data stream of the one or more data streams, a security protocol may be detected that applies to the data stream based at least in part on one or more of the source of the data stream, the endpoint media device, an identification of a user of the endpoint media device, and/or a time corresponding to when the data stream is being received. It may be determined, during streaming of the at least one data stream, whether the at least one data stream includes a particular composite specified by the security protocol. When it is determined that the at least one data stream includes the particular composite, one or more security operations may be performed in accordance with the security protocol.

In yet another aspect, a method to facilitate endpoint media device controls is disclosed. The method may include one or a combination of the following. One or more data streams may be processed as each data stream of the one or more data streams is received by one or more devices of a local network. The one or more data streams may facilitate presentation of audio, video, and/or textual content with at least one of the one or more devices of the local network that corresponds to an endpoint media device. The one or more data streams may be transmitted by a source that is external to the local network and each data stream may include a plurality of data elements. For at least one data stream of the one or more data streams, a security protocol may be detected that applies to the data stream based at least in part on one or more of the source of the data stream, the endpoint media device, an identification of a user of the endpoint media device, and/or a time corresponding to when the data stream is being received. It may be determined, during streaming of the at least one data stream, whether the at least one data stream includes a particular composite specified by the security protocol. When it is determined that the at least one data stream includes the particular composite, one or more security operations may be performed in accordance with the security protocol.

In various embodiments, the determining, during the streaming of the at least one data stream, whether the at least one data stream includes the particular composite specified by the security protocol may be based at least in part on performing speech recognition with respect to at least a portion of the at least one data stream. In various embodiments, the determining, during the streaming of the at least one data stream, whether the at least one data stream includes the particular composite specified by the security protocol may be based at least in part on image recognition with respect to at least a portion of the at least one data stream. In various embodiments, the determining, during the streaming of the at least one data stream, whether the at least one data stream includes the particular composite specified by the security protocol may be based at least in part on text recognition with respect to at least a portion of the at least one data stream. In various embodiments, the determining, during the streaming of the at least one data stream, whether the at least one data stream includes the particular composite specified by the security protocol may be based at least in part on pattern recognition with respect to one or more users and/or interactions associated with the at least one data stream. In various embodiments, the determining, during streaming of the at least one data stream, whether the at least one data stream includes the particular composite specified by the security protocol may include determining, during streaming of the at least one data stream, whether the particular composite includes a value associated with the particular composite that is consistent with one or more values specified in the security protocol. When it is determined that the data element includes a value associated with the particular composite that is consistent with the one or more values, information associated with the data element may be cached. The information associated with the data element may include the value associated with the particular composite included in the data element. In various embodiments, the one or more security operations may include causing sending of data corresponding to the audio, the video, and/or the textual content to a second media device.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Figure 1:
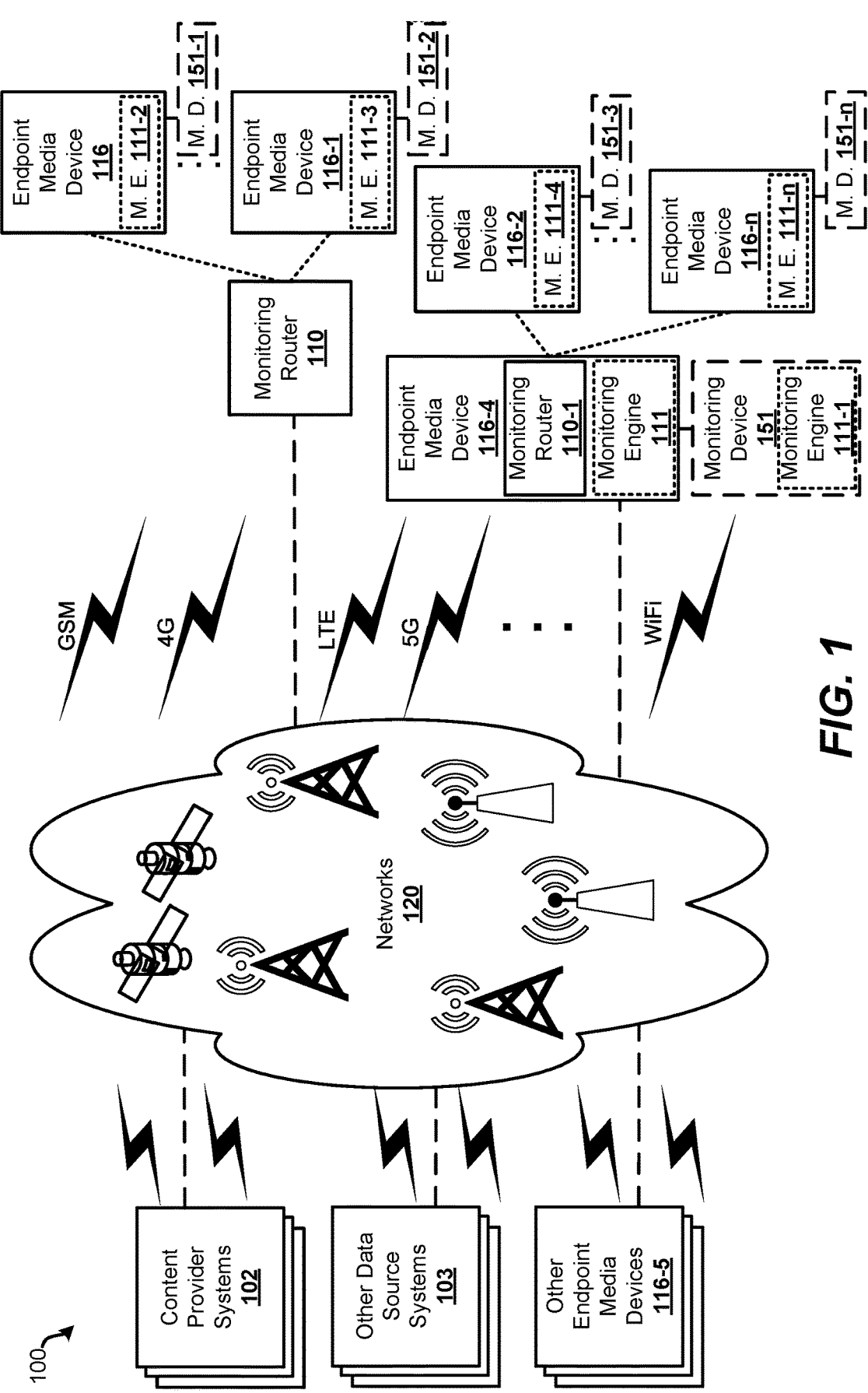
FIG. 1 illustrates a content distribution system, in accordance with disclosed embodiments according to the present disclosure.

Various embodiments will now be discussed in greater detail with reference to the accompanying figures, beginning with FIG. 1. FIG. 1 illustrates a content distribution system 100, in accordance with disclosed embodiments of the present disclosure. For brevity, system 100 is depicted in a simplified and conceptual form, and may generally include more or fewer systems, devices, networks, and/or other components as desired. Further, the number and types of features or elements incorporated within the system 100 may or may not be implementation-specific, and at least some of the aspects of the system 100 may be similar to a cable television distribution system, an IPTV (Internet Protocol Television) content distribution system, and/or another type of media or content distribution system.

In general, the system 100 may include a plurality of networks 120 that can be used for bi-directional communication paths for data transfer between components of system 100. The networks 120 may be or include one or more next-generation networks (e.g., 5G wireless networks and beyond). Further, the plurality of networks 120 may correspond to a hybrid network architecture with any number of terrestrial and/or non-terrestrial networks and/or network features, for example, cable, satellite, wireless/cellular, or Internet systems, or the like, utilizing various transport technologies and/or protocols, such as radio frequency (RF), optical, satellite, coaxial cable, Ethernet, cellular, twisted pair, other wired and wireless technologies, and the like. In various instances, the networks 120 may be implemented with, without limitation, satellite communication with a plurality of orbiting (e.g., geosynchronous) satellites, a variety of wireless network technologies such as 5G, 4G, LTE (Long-Term Evolution), 3G, GSM (Global System for Mobile Communications), another type of wireless network (e.g., a network operating under Bluetooth®, any of the Institute of Electrical and Electronics (IEEE) 802.11 suite of protocols, and/or any other wireless protocol), a wireless local area network (WLAN), a HAN (Home Area Network) network, another type of cellular network, the Internet, a wide area network (WAN), a local area network (LAN) such as one based on Ethernet, Token-Ring and/or the like, such as through etc., a gateway, and/or any other appropriate architecture or system that facilitates the wireless and/or hardwired packet-based communications of signals, data, and/or messages in accordance with embodiments disclosed herein. In various embodiments, the networks 120 and its various components may be implemented using hardware, software, and communications media such wires, optical fibers, microwaves, radio waves, and other electromagnetic and/or optical carriers; and/or any combination of the foregoing and/or the like. In some embodiments, the networks 120 may include a telephone network that may be circuit switched, package switched, or partially circuit switched and partially package switched. For example, the telephone network may partially use the Internet to carry phone calls (e.g., through VoIP). In various instances, the networks 120 may transmit data using any suitable communication protocol(s), such as TCP/IP (Transmission Control Protocol/ Internet protocol), SNA (systems network architecture), IPX (Internet packet exchange), UDP, AppleTalk, and/or the like.

The system 100 may include one or more content provider systems 102, one or more other data source systems 103, and media devices including monitoring and control routers 110 ("monitoring routers 110") and various endpoint devices 116. The endpoint devices 116 may, by way of example, include smartphones, tablet computers, television receivers, smart glasses or other similar forms of wearable computing devices, laptop computers, desktop/PC computers, home servers, smart speakers, display devices, smart radios, gaming consoles, vehicle computers, and/or one or more other I/O devices to facilitate local user interfaces configured to facilitate and/or implement security and control features disclosed herein. Many embodiments may include a large number of content provider systems 102, data source systems 103, and/or such media devices. The one or more content provider systems 102 may include one or more online gaming service provider systems (e.g., systems facilitating online, multiplayer gaming such as Steam, Epic Games, Xbox, PlayStation, etc.), live-generated and/or on-demand audio video streaming, sharing, and/or social networking systems (e.g., Twitch, YouTube, TikTok, and/or the like), television service provider systems, and/or the like. The content provider systems 102 may transmit data to the endpoint devices 116 via one or more networks of the networks 120 and the monitoring routers 110.

As illustrated, in some embodiments, the monitoring router 110 may be a separate media device that is distinct from, and communicating with, one or more endpoint media devices 116 within range of the monitoring router 110. The monitoring router 110 may facilitate communication of the one or more endpoint devices 116 via the networks 120 and may also facilitate communication of multiple endpoint devices 116 with each other by forming, for example, a LAN, a WAN, a HAN, a WLAN, and/or the like at various localities. In various embodiments, the monitoring router 110 can be in communication with one or more of the endpoint devices 116 using wired or wireless communications links. In some embodiments, the monitoring router 110 may additionally facilitate the endpoint devices 116 sending and/or receiving data to/from the data networks 120 via a separate, connected modem and one or more antennas. In other embodiments, the monitoring router 110 may include the one or more antennas and/or include the modem in whole or in part or otherwise be configured to provide the functionality of a modem in whole or in part.

In some embodiments, each monitoring router 110 may include a Layer 3 network gateway device. The monitoring router 110 may provide a bridge from one or more endpoint media devices 116 to a 5G wireless network of the networks 120. The monitoring router 110 may include any suitable routers, switches, modems, wireless transceivers, wired ports, etc., one or more processors, and input-output (I/O) interfaces, and one or more types of memory, with an operating system and instructions stored in non-transitory memory such that the monitoring router 110 may be configured to function as a special-purpose computer to provide the intelligent security monitoring and control features in accordance with various embodiments disclosed herein. The monitoring router 110 may differentiate and indicate different types of traffic at the OSI network layer, and intelligently route traffic suitable for a next-generation network (e.g., 5G wireless network and beyond), as well as other traffic. Each monitoring router 110 may be configured to identify received transmissions in particular types of protocols and then route the different types of packets differently, with prioritization and different network slicing based at least in part on packet type. Accordingly, the monitoring router 110 may provide more flexibility at the network layer so that the monitoring router 110 can make better decisions regarding content in accordance with control specifications and security protocols 212.

Additionally or alternatively, in various embodiments, one or more of the endpoint media devices 116 may include the monitoring router 110 in whole or in part or otherwise be configured to provide the functionality of the monitoring router 110 in whole or in part to the respective endpoint media device 116 itself and/or to one or more other endpoint devices 116. Likewise, in various embodiments, one or more of the endpoint media devices 116 may include the modem in whole or in part or otherwise be configured to provide the functionality of a modem in whole or in part to the respective endpoint media device 116 itself and/or to one or more other endpoint media devices 116. As such, various embodiments of the endpoint devices 116 may communicate with the networks 120 directly and/or indirectly via a separate monitoring router 110.

In some examples, a content provider system 102 may be configured to receive input data from the endpoint devices 116, via the monitoring routers 110, that corresponds to user input for online gaming (e.g., key presses, mouse movements, and other input) and transmit data to the endpoint devices 116 facilitate an online gaming experience (e.g., data packets with data indicating current/updated character states and player states for one or more characters/players in a game instance). Such data may include state data, message data to facilitate textual communications from/to particulars players in a multiplayer game (e.g., textual data to facilitate in-game chat features) and/or to update other portions of the game instance, audio data to facilitate audio communications from/to particulars players in a multiplayer game and/or to update other portions of the game instance, video data to facilitate video communications from/to particulars players in a multiplayer game and/or to update other portions of the game instance, and/or the like. By way of further example, a content provider system 102 may be configured to stream, via the networks 120 and the monitoring routers 110, audio content, video content, audiovisual content, textual content, television channels, on-demand programing, online shared video content, social media content, on-demand or programmed movies and other shows, television programs or portions of television programs following and/ or during a live broadcast of the television programs, advertising content and commercials, programming information (e.g., table data, electronic programming guide (EPG) content, etc.), and/or other services to endpoint devices 116 via Internet, satellite, 5G, 4G, and/or LTE wireless communication protocols and network components. In some instances, a content provider system 102 with satellite transmitter equipment, satellite uplink, and/or other network routing equipment that may, for example, be operated by a television service provider. The content provider system 102 may receive feeds of one or more television channels from various sources. Such television channels may include multiple television channels that contain the same content (but may be in different formats, such as high-definition and standard-definition). To transmit such data to endpoint devices 116, feeds of the data may be relayed to the monitoring routers 110 and the endpoint devices 116 via one or more satellites in the form of transponder streams or transmitted to the monitoring routers 110 and the endpoint devices 116.

In various instances, the content provider systems 102 may include or otherwise correspond to data source systems 103, and/or the data source systems 103 may be separate from the content provider systems 102. The data source systems 103 may correspond to any suitable sources of data such as one or more computer systems, databases, websites, portals, any repositories of data in any suitable form, server systems, other endpoint devices like endpoint devices 116 but functioning as data sources, and/or the like. In some instances, the data source systems 103 may include one or more mobile computing device locator services that provide information regarding the location of one or more of the endpoint devices 116 and/or the monitoring routers 110. In various instances, the data source systems 103 may provide various details relating to IP addresses, cellular tower identification and location data, mobile device triangulation data, LAN identification data, Wi-Fi identification data, access point identification and location data, and/or the like data that facilitates location of one or more of the endpoint devices 116 and/or the monitoring routers 110. In various embodiments, the data (e.g., location data indicating locations of endpoint devices 116 and/or the monitoring routers 110) from one or more of the data source systems 103 may be retrieved and/or received by a television service provider system 102 via one or more data acquisition interfaces through network(s) 120 and/or through any other suitable means of transferring data. In various embodiments, the television service provider system 102 and the data source systems 103 could use any suitable means for direct communication.

In various embodiments, one or more of the monitoring routers 110 and/or the endpoint devices 116 may include a monitoring and control engine 111 ("monitoring engine 111"). In addition or in alternative, the monitoring engine 111 may be included in another device, such as a monitoring device 151. The monitoring device 151 may be a separate device that may be couplable with one or more of the monitoring routers 110 and/or the endpoint devices 116. In various embodiments, one or more of the monitoring routers 110, the monitoring engines 111, and/or the monitoring devices 151 may include customized hardware. In various embodiments, one or more of the monitoring routers 110, the monitoring engines 111, and/or the monitoring devices 151 may include particular elements might be implemented in hardware, software (including portable software, such as applets, etc.), or both. By way of example, the monitoring device 151 may, in some embodiments, connect to an interface of the endpoint device 103 and/or to an interface of the monitoring router 110, where such interface may correspond to one or a combination of peripheral interfaces and/or ports, AV output and/or input ports, VGA interfaces, Bluetooth interfaces, USB interfaces, USB-c interfaces, HDMI interfaces, and/or the like. In some embodiments, for example, the monitoring device 151 may connect directly to the TV's audio output via Bluetooth or VGA splitter, and/or the like. Such direct connections may minimize privacy concerns by avoiding picking up background conversation, or conversation from other members of the household.

In various embodiments, one or more of the monitoring engines 111 and/or the monitoring devices 151 may include, be, or otherwise correspond to code and/or a computer program that can be installed and run on one or more of the monitoring routers 110 and/or the endpoint devices 116. In various embodiments, one or more of the monitoring engines 111 and/or the monitoring devices 151 may be a mobile app, another type of application, set of applications, and/or other executable code configured to facilitate embodiments disclosed herein. The one or more of the monitoring engines 111 and/or the monitoring devices 151 may be provided in any suitable way. For non-limiting example, one or more of the monitoring engines 111 and/or the monitoring devices 151 may be made available from a website, an application store, the service provider 102, etc. for download to one or more of the monitoring routers 110 and/or the endpoint devices 116. Alternatively, one or more of the monitoring engines 111 and/or the monitoring devices 151 may be pre-installed on the media device 118-2.

In various embodiments, the monitoring engines 111 and/or the monitoring devices 151 may be configured to allow for security and control information to be presented to a user via displays of the endpoint devices 116. The monitoring engines 111 and/or the monitoring devices 151 may be configured to overlay information, such as security and control information, onto a signal to be visually presented via displays of the endpoint devices 116.

In some embodiments, the monitoring engines 111 and/or the monitoring devices 151 may be communicatively in-line with output signals of endpoint devices 116. For example, the monitoring engines 111 and/or the monitoring devices 151 may be communicatively between the output signals of the endpoint devices 116 and corresponding displays thereof. Thus, in some embodiments, rather than be directly input to a display device integrated with or separate from an endpoint device 116, the output of the endpoint device 116 may be input to the monitoring engines 111 and/or the monitoring devices 151. The monitoring engines 111 and/or the monitoring devices 151 may receive the video, audio, textual and/or other data output from the endpoint device 116.

The monitoring engines 111 and/or the monitoring devices 151 may be configured to monitor data streams (e.g., packets of video, audio, textual and/or other data) to and from the endpoint devices 116. For example, the monitoring engines 111 and/or the monitoring devices 151 may monitor video, audio, textual and/or other data that is passed to and from the endpoint device 116 via the monitoring routers 110 and the one or more networks 120, to/from content provider systems 102, data source systems 103, and/or other endpoint media devices 116. In various embodiments, the monitoring engines 111 and/or the monitoring devices 151 may be configured to initiate agents configured to detect particular composites in the data streams that may be mapped to one or more particular user identifiers, particularized control specifications 210, particular types of media, particular applications, particular types of devices, and/or particular security protocols 212. In some embodiments, the agents may monitor for, and be specific to, media type (e.g., message data, textual data, video data, audio data, and/or the like), a particular user, a particular application, and/or a particular security protocol 212. The one or more agents may, in various embodiments, correspond to a bot, a listener, and/or the like, and may conform to any suitable protocol. The agents can be used to detect and evaluate packets based on video, audio, textual and/or other data included with the packets or otherwise related to the packets. Accordingly, the monitoring engines 111 and/or the monitoring devices 151 may be configured to use the agents to detect particular composites corresponding to the occurrence of trigger events. The trigger events can be any suitable event that relates to content received by the endpoint media device 116 and/or the monitoring router 110 that is identified for one or more security operations 282 by the subsystem 112 disclosed herein.

In various embodiments, the monitoring engines 111, the monitoring devices 151, and/or the monitoring routers 110 may include one or more application programming interfaces (APIs) that define protocols and routines for interfacing with other components of the local network and/or the service provider system 102. The APIs may specify application programming interface (API) calls to/from other components of the local network and/or the service provider system 102. In some embodiments, the APIs may include a plug-in to integrate with an application of an endpoint media device 116 and/or the monitoring router 110. The monitoring engines 111, the monitoring devices 151, and/or the monitoring routers 110 may, in some embodiments, could use a number of API translation profiles configured to allow interface with the one or more additional applications of the endpoint media devices 116 to access data for monitoring and security operations 282 (which may be referenced herein as security operations 282, parental control operations 282, and/or control operations 282) disclosed herein.

Figure 2:
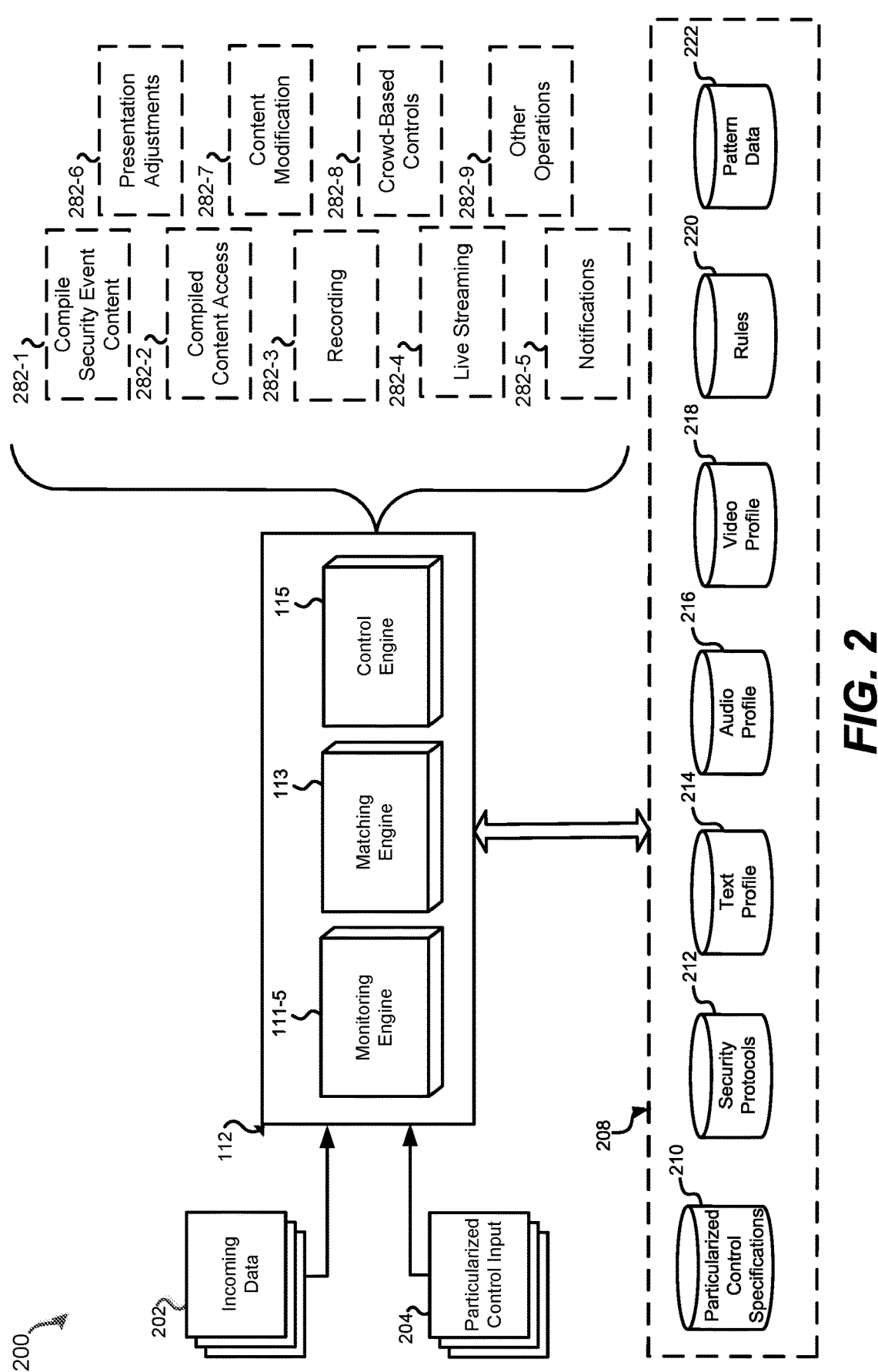
FIG. 2 illustrates a functional diagram of a media security and control system, in accordance with disclosed embodiments according to the present disclosure.

FIG. 2 illustrates a functional diagram of a media security and control system 200, in accordance with embodiments of the present disclosure. As depicted, the media security and control system 200 includes a media security and control subsystem 112. In certain embodiments, the media security and control system 200 may be included in the end-user system and, in various embodiments, may be included in the monitoring router 110, monitoring engine 111, and/or the monitoring device 151. In certain embodiments, various features of the media security and control system 200 may be distributed among the monitoring router 110, monitoring engine 111, and/or the monitoring device 151. In certain embodiments, various features of the media security and control system 200 may be distributed among the monitoring router 110, monitoring engine 111, and/or the monitoring device 151, and upstream of the monitoring router 110, monitoring engine 111, and/or the monitoring device 151 (e.g., at the content provider system 102).

In various embodiments, for example, certain operations disclosed herein (e.g., audio processing, text processing, video processing, corresponding recognition processes, comparison of the incoming data 202 to audio, video, and/or text profile, etc.) may be performed in the cloud (e.g., the content provider system 102) when available bandwidth, latency, and/or processing times are determined by the subsystem 112 to meet corresponding bandwidth, latency, and/or processing time thresholds (which may be predetermined by default specifications or user-specified via control specifications) and may be transitioned to being performed locally by the monitoring router 110, monitoring engine 111, and/or the monitoring device 151 when one or more of such thresholds are not satisfied by the detected bandwidth, latency, and/or processing times. When such metrics change and are determined to satisfy such thresholds, the operations may again be transitioned back to the cloud, with the monitoring router 110, monitoring engine 111, and/or the monitoring device 151 sending the data (e.g., text, audio, and/or video data) to the backend system for processing. In various embodiments, as another example, such operations may be performed by default or transitioned to be performed by the monitoring router 111 when processing times at the endpoint media device 116 and/or the monitoring device 151 are determined by the subsystem 112 to not satisfied one or more processing thresholds. The monitoring router 111 may include one or more suitable processors and memory configured to handle such processing-intensive operations. In various embodiments, the subsystem 112 may hierarchically prioritize which types of data and/or processing is transitioned for performance locally versus in the cloud, and/or with the monitoring router 110 versus at the endpoint media device 116 and/or the monitoring device 151. Such hierarchical prioritization may be determined by the subsystem 112 as a function of detected metrics in comparison to thresholds for available bandwidth, latency, and/or processing times. As one example out of many possible examples, the subsystem 112 may prioritize performing audio and/or text processing locally rather than transmitting the audio and/or text data via the one or more networks 120 (e.g., to better preserve security and/or privacy), while video processing may be the first to be transitioned to being performed in the cloud. Other embodiments are possible.

In some embodiments, the media security and control subsystem 112 may include or otherwise correspond to an audiovisual control engine. The media security and control subsystem 112 may be communicatively coupled with interface components and communication channels (e.g., of the monitoring router 110 and/or the endpoint media device 116, which may take various forms in various embodiments as disclosed herein) configured to receive incoming data 202 and particularized control input 204. The one or more monitoring engines 111 of the media security and control subsystem 112 may be configured to receive particularized control input 204 and/or incoming data 202 in order to facilitate media security and control features disclosed herein. In some embodiments, the monitoring engine 111 may be configured to aggregate, pull, process, buffer, organize, rank, and/or store incoming data 202 and/or particularized control input 204.

In various embodiments, the incoming data 202 may be streaming data, more or less continuously received data, downloading data, and/or the like, and may be for immediate or otherwise subsequent presentation with the display of the endpoint media device 116 and/or may facilitate immediate or otherwise subsequent presentation of corresponding content. The incoming data 202 may, for example, correspond to one or a combination of streaming data, packets of video, audio, textual and/or other data corresponding to online gaming data to facilitate an online gaming session, state data, message data, audio content, video content, audiovisual content, textual content, television channels, on-demand programing, online shared video content, social media content, on-demand or programmed movies and other shows, television programs or portions of television programs following and/or during a live broadcast of the television programs, advertising content and commercials, programming information (e.g., table data, electronic programming guide (EPG) content, etc.), other services, and/or the like. In some embodiments, the media security and control system 200 may retain (e.g., cache, buffer) received incoming data 202 in one or more caches or other content repositories 208 that may include any suitable form of storage media.

In various embodiments, the particularized control input 204 may indicate, include, and/or be used to develop particularized security and control specifications 210. The particularized security and control specifications ("particularized control specifications") 210 may govern monitoring operations and may include: specifications of devices, applications, and/or types of media to monitor, including identifiers of particular devices, applications, and/or types of media; specifications of users to monitor, including identifiers of particular users; specifications of trigger events disclosed further herein; specifications of security protocols 212 that apply to particular devices, users, and/or trigger events; and/or the like. The particularized control input 204 and/or the particularized control specifications 210 may include: specifications of content composites for the subsystem 211 to detect in the data 202; specifications of keywords, expressions, character strings, symbols, and/or the like which may be included in one or more text profiles 214 and which the subsystem 211 may detect as trigger events corresponding to one or more security protocols 212; specifications of keywords, expressions, songs, sounds, voice characteristics, and/or the like which may be included in one or more audio profiles 216 and which the subsystem 211 may detect as trigger events corresponding to one or more security protocols 212; specifications of people, characters, attributes of characters, types of characters, types of scenes, and types of actions, uniform resource identifiers, phone numbers, provider systems 103, text, logos, products, graphics, and/or the like which may be included in one or more video profiles 218 and which the subsystem 211 may detect as trigger events corresponding to one or more security protocols 212; and/or the like. The control specifications 210 may be retained in any suitable form, such as files, lists, tables, indexes, key-value data structures, and/or the like, and may be keyed to, point to, link to, and/or otherwise reference particular security protocols 212, text profiles 214, audio profiles 216, video profiles 218, rules 220, pattern data 222, and/or the like. Likewise, the security protocols 212 may be retained in any suitable form, such as files, lists, tables, indexes, key-value data structures, and/or the like, and may be keyed to, point to, link to, and/or otherwise reference text profiles 214, audio profiles 216, video profiles 218, rules 220, pattern data 222, and/or the like. A security protocol 212 (which may be referenced herein as a parental control protocol 212, safety protocol 212, device control protocol 212, and/or control protocol 212) may correspond to a particular set of one or more rules 220, text profiles 214, audio profiles 216, video profiles 218, pattern data 222, one or more user profiles, and/or the like with which the subsystem 112 may develop pursuant to the ongoing learning algorithms and features disclosed herein in conjunction with user-explicit specifications of preferences and customizations of the operations of the subsystem 112. Advantageously, the subsystem 112 may evolve the above features over time to adapt as kids grow, based at least in part on known or inferred ages of users. Over time, the subsystem 112 may recognize the passage of time and begin to notify the authorized users as a function of the advancing age of the monitored users. For example, when a trigger event was previously applicable to the user that was approximately eight years old, the subsystem 112 may notify and request confirmation from the authorized user that the trigger event and corresponding security measures still apply when the subsystem 112 determines that the user should now be approximately 10 years old and determines from the crowd-based data that a majority or a plurality of parents in the local area do something different with respect to the trigger event and their 10-year-olds. In various embodiments, the security protocol 212 and/or the particular set may correspond to one or a combination of objects, files, executable code segments, and/or the like which may be linked with pointers and/or other references in a decision tree data structure. Various embodiments of the security protocols 212 may employ a protocol order, such as a decision tree, checklist, workflow, and/or the like.

The control specifications may correspond to user input received via a device of the local network, such as an endpoint media device 116 and/or the monitoring router 110. In various embodiments, the monitoring engine 111, the monitoring device 151, and/or the monitoring router 110 may facilitate a user interface via the endpoint media device 116 and/or the monitoring router 110 through which users may control and view settings of the subsystem 112 and view monitoring and control information and content. Accordingly, settings, information, and content may be displayed via the endpoint media device 116 and/or the monitoring router 110 with the user interface, and interface elements of the user interface may allow for user input/selection to provide control specifications via the endpoint media device 116 being monitored and/or another device of the local network such as the monitoring router 110 and/or another endpoint media device 116 which may or may not be monitored. For example, parents or guardians may identify words or topics they want the subsystem 112 to use as triggers. They can also choose from preset lists designed for different user categories, such as pre-school age children, school-aged children, and teenagers. They can choose from a variety of desired actions corresponding to security operations 282 if inappropriate content is detected in content (e.g., text, audio, video) received by the monitoring router 110 and/or the endpoint media device 116.

Additionally, the control specifications 210 may correspond to collected specifications from users outside of the local network. Such crowd-sourced specifications may include one or a combination of: particularized control specifications 210 from one or more other subsystems 112; specifications of text, audio, and/or video corresponding to one or more text profiles 214, audio profiles 216, and/or video profiles 218 corresponding to trigger events for security operations 282 from one or more other subsystems 112; specifications of security operations 282 responsive to trigger events from one or more other subsystems 112; security protocols 212 from one or more other subsystems 112 that may specify one or more user categories, corresponding text profiles 214, audio profiles 216, and/or video profiles 218, and corresponding security operations 282 responsive to trigger events (e.g., for a particular age category, type of media, type of app, type of endpoint media device, geolocation, etc.); and/or the like. In some embodiments, the subsystem 112 may be configured to communicate user input corresponding to such specifications to the service provider system 102. Likewise, other instances of the subsystem 112 in other local networks may be configured to communicate user input corresponding to such specifications for each local network to the service provider system 102. In so doing, the subsystems 112 may de-identify the data corresponding to the specifications, obscure user identifiers, and/or create reporting data regarding the specifications that maintains the privacy of users from each local network. Accordingly, privacy of users may be maintained while aggregation and consolidation of the specifications may be performed by the service provider system 102. In various embodiments, the system 102 may actively gather and/or pull such specifications from the subsystem 112. Additionally or alternatively, the system 102 may wait for updates from one or more of the subsystems 112.

Additionally or alternatively, the subsystem 112 may be configured to communicate user input corresponding to such specifications to one or more other subsystems 112 with peer-to-peer communications in a peer-to-peer network. In some embodiments, service provider system 102 may facilitate the peer-to-peer communications, for example, by specifying to the monitoring engine 111, the monitoring device 151, and/or the monitoring router 110 in one local network other monitoring engines 111, monitoring devices 151, monitoring routers 110, and/or corresponding endpoint media devices 116 (e.g., specifying by way of corresponding IP addresses, MAC addresses, and/or the like) in one or more other local networks (e.g., corresponding to a geographic region). Consequently, the devices of the multiple local networks may communicate the specifications to each other. For the communications, each subsystem 112 may de-identify the data corresponding to the specifications, obscure user identifiers, and/or create reporting data regarding the specifications that maintains the privacy of users from each local network. In various embodiments, each subsystem 112 may actively gather and/or pull such specifications from one or more peer subsystems 112. Additionally or alternatively, each subsystem 112 may wait for updates from one or more peer subsystems 112.

The consolidated control specifications 210 may form crowdsourced trends of trigger events and corresponding security operations 282 for differentiated categories of users. Thus, for example, what most parents (e.g., simple majority, a plurality, or another suitable threshold of users as determined by the system 102) in a geographic region (e.g., corresponding to a block, neighborhood, street, ZIP Code, city, county, state, region, country, etc.) specify as objectionable content corresponding to a trigger event (e.g., specified via text profiles 214, audio profiles 216, video profiles 218, and/or the like) for a six-year-old may be identified based at least in part on the consolidated control specifications 210. Similarly, what most parents in the geographic region specify as a security operation consequent to the trigger event (e.g., via security protocols 212) may be identified based at least in part on the consolidated control specifications 210. In some embodiments, the crowd-based control specifications may be utilized as default control specifications 210 for a particular local network in the geographic region. In some embodiments, such crowd-based control specifications may be an option for a user to opt into via the user interface. For example, the subsystem 112 may send notification to an authorized user via the user interface of an authorized endpoint media device 116, with indications such as "This youtuber gets blocked by most parents of kids under 10 in your neighborhood," and causing presentation of one or more interface options to allow the authorized user to ignore the notification, likewise update the security protocol 112 of one or more users and/or endpoint media devices 116 in the household to block the youtuber or take other security operations 282, and/or the like.

In various embodiments, the subsystem 112 may actively gather and/or pull crowd-based specifications from the system 102 and/or the subsystem 112 may wait for updates pushed from the system 102. In such embodiments, the system 102 may perform the collecting and consolidating operations with respect to the specifications for differentiated categories of users for a particular geographic region. The subsystem 112 may communicate to the system 102 identifications of the one or more user categories needed (e.g., age category, type of media, type of app, type of endpoint media device, etc.) and/or the geolocation of the endpoint media devices 116, and the system 102 may consolidate and select corresponding specifications for the identified one or more user categories and/or the geolocation to communicate to the subsystem 112. Additionally or alternatively, the subsystem 112 (e.g., with the monitoring engine 111 and a matching engine 113) may perform the collecting and consolidating operations 210 with respect to the control specifications for differentiated categories of users for the particular geographic region. The subsystem 112 may then use the corresponding control specifications 210, security protocols 212, text profiles 214, audio profiles 216, video profiles 218, and/or rules 220 for the one or more user categories and/or the geolocation identified by the subsystem 112.

The media security and control subsystem 112 may include one or more matching engines 113 that may include logic to implement and/or otherwise facilitate any recognition, taxonomy, classification, categorization, correlation, mapping, qualification, scoring, organization, and/or the like features disclosed herein. In some embodiments, the matching engine 113 may be included in the monitoring engine 111; in some embodiments, the matching engine 113 may be separate from the monitoring engine 111 and, as disclosed above, may be included in other components of the subsystem 112 such as a monitoring router 110 or in an upstream component such as the provider system 102. In various embodiments, the matching engine 113 may be configured to analyze, recognize, classify, categorize, characterize, tag, and/or annotate particularized control input 204 and/or incoming data 202. In some embodiments, the matching engine 113 may be, include, or otherwise correspond to a learning engine that may be an analysis engine that employs machine learning. The learning engine may further employ deep learning. Accordingly, the learning engine may facilitate machine learning or, more specifically, deep learning, to facilitate creation, development, and/or use of crowd-based control specifications, interaction pattern data, particularized control specifications 210, and security protocols 212. For example, based at least in part on taking into account received control specifications from other subsystems 112 as part of an ongoing feedback loop, the learning engine may employ an ongoing learning mode to develop crowd-based control specifications for particular user categories, types of media, applications, types of devices, and/or geographic regions, and to confirm, correct, and/or refine determinations made for crowd-based control specifications. The subsystem 112 may be configured to employ machine learning to process the control input 204 and corresponding incoming data 202 to derive and develop the crowd-based control specifications, interaction pattern data, particularized control specifications 210, and security protocols 212. The subsystem 112 may be configured to employ deep learning to process the control input 204 and corresponding incoming data 202 to derive and develop the crowd-based control specifications, interaction pattern data, particularized control specifications 210, and security protocols 212. The learning engine may be configured to perform any one or combination of features directed to matching or otherwise correlating the control input 204 and corresponding incoming data 202.

Accordingly, for example, the monitoring engine 111 and/or the monitoring device 151 may monitor one or more data streams as each data stream of the one or more data streams is received by one or more monitoring routers 110 and/or endpoint media devices 116 of a local network. The monitoring engine 111 and/or the monitoring device 151 may process the data streams as the data stream is received. For a particular data stream, the monitoring engine 111 and/or the monitoring device 151 may detect that a security protocol 212 that applies to the data stream based at least in part on the particularized control specifications 210. For example, the particularized control specifications 210 may specify a security protocol 212 that applies to the data stream based at least in part on the one or more of the source of the data stream (e.g., a data source system 103 and/or another endpoint media device 116), the identifier of the endpoint media device 116, an identification of a user of the endpoint media device 116, and/or a time corresponding to when the data stream is being received (e.g., a particular security protocol 212 may apply to nighttime hours or other times of day, days of week, etc.). The monitoring engine 111 and/or the monitoring device 151 may identify the user using one or a combination of a user ID, login credentials, an assignment of the endpoint media device 116 to the user, IP address of the endpoint media device 116, MAC address of the endpoint media device 116, facial recognition using one or more cameras communicatively coupled with the endpoint media device 116, voice recognition using one or more microphones communicatively coupled with the endpoint media device 116, and/or matching observations data of the user to tracking data that may correspond to chronicle of interactions, commands, content accesses, voice prints, and/or the like. The monitoring engine 111 and/or the monitoring device 151 may identify which criteria applies to the data stream and may match the criteria to the corresponding security protocol 212.

Trigger events may be defined by the security protocol 212, which may that specify criteria for when the detection of one or more content composites constitutes one or more trigger events. In some embodiments, detecting that a particular security protocol 212 applies to the data stream may trigger initiating one or more listeners/agents to detect content composites based at least in part on a set of criteria that may indicate types of content composites to be intercepted. In some examples, content composites may be parsed to determine details about the content composites that fulfill the criteria. The monitoring engine 111, the matching engine 113, and/or the monitoring device 151 may determine, during streaming of the data stream (e.g., as the data stream is received in the incoming data 202 in real-time or near-real-time), whether the data stream includes a particular composite specified by the security protocol 212. In various embodiments, the composite detection may include one or a combination of text recognition, image recognition, audio recognition, and/or pattern recognition, which may be specified by the security protocol 212 (e.g., along with specifying which profiles are used for the monitoring). In some examples, the matching engine 113 may process and recognize text from message data, chat data, text data for display by the particular applications, metadata (which may include closed captioning information), user identifiers, and/or the like of the incoming data 202 that maps to one or more text profiles 214 and/or reference keywords, expressions, character strings, symbols, and/or the like which may be included in the one or more text profiles 214 and may each have associated attributes and/or fields corresponding to whether it is flagged as prohibited, offensive, potentially objectionable, and/or the like. Accordingly, the subsystem 112 may utilize text profiles 214 as text-processing filters to facilitate various text-recognition features disclosed herein.

To facilitate audio recognition, the subsystem 112 (e.g., by way of the matching engine 113) may be configured to detect one or more audio characteristics in incoming data 202. The matching engine 113 may include an audio analyzer and handling module to facilitate that detection. By way of example, the matching engine 113 may detect one or more audio characteristics in incoming data 202 by way of any one or combination of analyzing audio, applying voice recognition, acoustic spectrum analysis, analyzing the audio tracks and/or metadata tracks, and/or the like of the incoming data 202 that maps to one or more audio profiles 216 and/or reference keywords, expressions, songs, sounds, voice characteristics, and/or the like which may be included in the one or more audio profiles 216 and may each have associated attributes and/or fields corresponding to whether it is flagged as prohibited, offensive, potentially objectionable, and/or the like. The subsystem 112 may utilize audio profiles 216 as audio-processing filters to facilitate various audio-recognition features disclosed herein. The subsystem 112 may, for example, recognize one or more keywords and/or expressions in the dialogue that the matching engine 113 may correlate to elements identified in an audio profile 216 corresponding to a selected security protocol 212 for the purposes of characterizing the content and identifying content composites in the incoming data 202. Accordingly, in various embodiments, the correlation may be based at least in part on matching detected composites to identical and/or similar reference keywords, expressions, character strings, symbols, songs, sounds, voice characteristics, and/or the like specified in one or more text profiles 214 and/or audio profiles 216 corresponding to the selected security protocol 212.

To facilitate image recognition, some embodiments of the monitoring engine 111, the matching engine 113, and/or the monitoring device 151 may determine may be configured to detect one or more color characteristics in the data stream, which may include any suitable color characteristic that may be measured to recognize alpha and/or numerical portions of the images and/or objects in the images. The matching engine 113 may include an image analyzer and handling module to perform image analyses and facilitate that detection. By way of example, the matching engine 113 may detect one or more color characteristics in incoming data 202 by way of any one or combination of pixel identification, detecting color component values, detecting color codes, and/or the like. For example, from such portions and/or objects, the matching engine 113 may recognize people, characters, attributes of characters, types of characters, and types of actions (e.g., via facial recognition and/or pattern recognition/matching); uniform resource identifiers (e.g., URLs, web addresses, etc.); phone numbers; identifiers of provider systems 103; text and logos; products; graphics displayed with streaming tickers or overlays typically positioned and/or scrolling across a portion of the display area; and/or the like which the matching engine 113 may correlate, using any suitable facial or object trait qualifications for correlation, to one or more video profiles 218 and/or reference images which may be included in the one or more video profiles 218 and may each have associated attributes and/or fields corresponding to whether it is flagged as prohibited, offensive, potentially objectionable, and/or the like. Accordingly, the subsystem 112 may utilize video profiles 218 as audio-processing filters to facilitate various image-recognition and video-recognition features disclosed herein.

To facilitate the matching, the matching engine 113 may perform correlation based at least in part on the text recognition, image recognition, and/or audio recognition and text, image, and/or audio profiles 216 and/or reference data. By way of example, the correlation rules 220 may include correlation criteria that could include keywords identified by any one or combination of words, word stems, phrase, word groupings, and/or like keyword information. The correlation criteria could include weightings assigned to text, image, and/or audio specifications. Hence, within each bucket, a keyword could be assigned a weight according to its significance. More significant keywords could be assigned a greater weight than stop words. Such buckets could be implemented in any suitable manner, including lists, tables, matrices, and/or the like. And within a bucket, characteristics and/or keywords could be organized in a rank order and/or any hierarchical structure according to weight. Some embodiments may have characteristics and/or keywords organized according to decision trees, with contingencies so that only certain combinations of characteristics and/or keywords may be considered. For example, certain characteristics and/or keywords could only have significance if used in conjunction with other characteristics and/or keywords, and/or not in conjunction with others. Similar correlation criteria may be used for other acoustic and image correlations.

In some embodiments, the matching engine 113 may employ a scoring system to quantify correlations with a numerical expression, for example, a match score, with higher scores being assigned to higher correlations. Higher scores may be assigned for greater extents of matching. As an example, an exact match of words, expressions, and/or dialogue categories may be assigned a higher score than a complimentary match (e.g., where absent an exact match, a word, expression, and/or word category is defined as a complement to another word, expression, and/or word category). In some embodiments, the image recognition processes may yield an identification score. Any suitable identification scale may be used in various embodiments. In some embodiments, an identification scale could entail a scoring system. Some embodiments may score recognition of an individual, a character, one or more attributes of a character, a type of character, and a type of action displayed, etc. with a numerical expression, for example, an identification score. For example, in some embodiments, an identification score may be an assessment of a certainty with which the system identifies an individual, a character, one or more attributes of a character, a type of character, and a type of action displayed, etc. By way of example without limitation, an identification scale could include a range of identification scores from 0 to 100, or from 0 to 1,000, with the high end of the scale indicating greater probability. Some embodiments may use methods of statistical analysis to derive an identification score. Various embodiments may determine an identification score based on any one or more suitable quantifiers. An identification score may be based at least in part on the extent to which detected characteristics of the captured data match previously determined characteristics. With an identification score determined, categorizations may be made based on the score. By way of example without limitation, a score correlated to a 75-100% band may be deemed a positive identification; a score correlated to a 50-75% band may be deemed a possible identification; a score correlated to a 25-50% band may be deemed a weak identification; a score below a 50% minimum threshold may be deemed a weak/insufficient identification; and score of zero may correspond to an unknown aspect. Accordingly, the subsystem 112 may provide for live machine-rating for unrated content, i.e., on-the-fly rating as a live stream proceeds.

In various embodiments, the matching engine 113 may create and/or develop one or more text profiles 214, one or more audio profiles 216, and/or one or more video profiles 218 based at least in part on one or a combination of crowd-sourced specifications corresponding to control specifications 210, security protocols 212, text profiles 214, audio profiles 216, video profiles 218, and/or rules 220 from other subsystems 112; control input 204 received from one or more users of endpoint media devices 116 of the local network; ongoing learning by the subsystem 112 to develop, confirm, correct, and/or refine determinations with respect to the profiles (e.g., composites that should be monitored for as being triggers for prohibited content or content that is potentially prohibited or otherwise requires further security operations) using control input 204 received from one or more users of endpoint media devices 116 of the local network and/or crowd-sourced specifications. The profiles may be retained in any suitable form, such as files, lists, tables, indexes, key-value data structures, and/or the like. In various embodiments, the one or more text profiles 214, one or more audio profiles 216, and/or one or more video profiles 218 may be available from a remote source and may be stored in data storage 208.

The matching engine 113 may employ one or more artificial intelligence (machine learning or, more specifically, deep learning) algorithms to perform pattern matching to detect patterns of metrics of interactions observed in various types of instances where one or more users of the endpoint media device 116 are engaged in interactive applications and sessions involving one or more additional remote users (e.g., multiplayer games, chats, messaging, forums, videoconferences, web meetings, and/or the like). Thus, the matching engine 113, which may include a learning engine, may be configured to perform pattern detection with respect to users and interactions and develop interaction pattern data 222. The learning engine may facilitate machine learning or, more specifically, deep learning, to facilitate creation, development, and/or use of the interaction pattern data 222.

The pattern detection may include recognition of identified users and differentiation from unidentified users in particular multiplayer/multiuser platforms, applications, channels, forums, and/or the like. Accordingly, the subsystem 312 may differentiate between regular users/friends and new/unidentified users/strangers interacting on various platforms. Likewise, the subsystem 312 may differentiate between different types of users, such ages and maturities of users, in order to detect user mismatches (e.g., detecting a new/unidentified adult user on a platform/game that is normally populated by kids). Subsystem-recognition of remote users that are new, unidentified, out-of-context, and/or otherwise deviating from baselines may correspond to trigger event for consequent security operations 282. The pattern detection may include recognition of conversations, differentiating different types of conversations, and categorizing the conversations according to the recognized types of conversations. For example, the matching engine 113 may recognize particular communication characteristics of users (e.g., voice characteristics; facial and/or other image characteristics; types of language and expressions used; frequency and/or speed of communications interactions; temporal data such as times of communications interactions; characteristics of the communications such as characteristics of negative talk, bullying, other inappropriate communications; images and/or files transferred; emojis and/or gifs used; and/or the like), corresponding user identifiers, profile information, IP addresses, MAC addresses, and/or contact information, and map the particular communication characteristics to a particular individual, and create/develop pattern data 222 corresponding to such mappings.

The matching engine 113 may compile any one or combination of such data to create, based at least in part on machine-learning, pattern data 222 that may include pattern particulars to facilitate detection, recognition, and differentiation of patterns for individuals and other aspects of the interaction on the various platforms. The matching engine

113 may include a reasoning module to make logical inferences from a set of the detected and differentiated data to infer one or more patterns of identification data, communication data, device operation data, location data, temporal data, contextual data, and/or the like for individuals and aspects of the interactions detected. For instance, the pattern data may include information about any one or combination of identification histories, communication histories, device operation histories, location histories, temporal histories, and/or the like, any set of which may be used to derive one or more of such patterns. A pattern-based reasoner could be employed to use various statistical techniques in analyzing the data in order to make inferences based on the analysis of the different types of pattern data 222, both current and historical. A transitive reasoner may be employed to infer relationships from a set of relationships related to different types of pattern data 222.

For example, interactions between younger users (e.g., ages 5 to 7) may be differentiated from interactions between older users (e.g., ages 10 to 12). The interaction pattern data 222 may be used by the subsystem 112 to enforce security operations 282 as a function of the interaction pattern data 222. In some examples, the subsystem 112 may recognize a mismatch of a monitored user of an endpoint media device 116 and/or an associated security protocol 212 with respect to one or more other remote users interacting with the monitored user, say, a mismatch of the estimated age levels of the monitored user and the one or more remote users. Such a mismatch could correspond to a trigger event defined by the control specifications 210 and/or the applicable security protocol 212 (e.g., because a parent of a second-grader may be concerned that what might be acceptable "trash-talking" in multiplayer game context at a second-grade level is different from "trash-talking" at seventh-grade level, which might be unacceptable) that may cause one or more security operations 282.

The subsystem 112 may include a control engine 115, which may be configured to cause one or more security operations 282 in accordance with one or more security protocols 212. For example, when the subsystem 112 detects that a particular security protocol 212 applies to a data stream being received by the monitoring router 110 and/or a particular endpoint media device 116 and that the data stream includes a particular composite specified by the security protocol 212 (e.g., with one or more of the profiles associated with the security protocol 212), the control engine 115 may cause one or more security operations 282 to be performed in accordance with the security protocol 212. Conventional systems and approaches are deficient in timeliness, adaptability, sensitivity, responsiveness, and access to facilitate media device security, interaction, and control with respect to endpoint media devices 116. The technical improvements provided by the subsystem 112 include improvements in timeliness, adaptability, sensitivity, and responsiveness in machine control for media device security, interaction, and control with respect to endpoint media devices 116 based at least in part on adaptive machine-based control that causes security operations 282.

In some embodiments, the control engine 115 may include a multiplexer. The security operations 282 may include compiling security event content 282-1 and providing access to the compiled security event content 282-2. In various embodiments, the multiplexer may select one or more portions of the content surrounding detected content composite that corresponds to a trigger event to provide to one or more authorized users (e.g., parents, guardians, etc.) via an application of one or more endpoint media devices

116. In various examples, the detected composite, whether it includes text, audio, and/or video, may be selected, as well as a portion prior to the detected composite and/or a portion subsequent to the detected composite. The selected portions may be stored, at least temporarily, for consequent provisioning to an authorized user. The selected portions may be provisioned as a report in some embodiments. In some embodiments, the control engine 115 may compile the one or more keywords, expressions, character strings, symbols, songs, sounds, voice characteristics, and/or the like detected by the matching engine 113 as matching one or more elements in one or more of the profiles and may retain the detected composites in a file to report them via an user interface of the one or more of the endpoint media devices 116 as a textual impression, audio impression, and/or video impression to be accessed after the trigger event.

The security operations 282 may include live streaming 282-3 a duplicate of the data stream content as it presented on the endpoint media device 116 being monitored to another endpoint media 116. In various embodiments, the control engine 115 may create a digital stream of data packets containing the text, audio, and/or video to output the incoming data 202 to the one or more endpoint media devices 116 of the one or more authorized users. The control engine 115 may live stream, for example, via buffering, copying and streaming the content, screen mirroring, audio mirroring, text mirroring, and/or the like, the data stream content to one or more endpoint media devices 116 of an authorized user. Thus, the security operations 282 may include live streaming 282-3 the data stream content as it presented on the endpoint media device 116 in full, or partially such as one or a combination of live streaming of video, live streaming of audio, and/or live streaming of text. Accordingly, the subsystem 112 may allow for streaming live audio, video, and/or text to a connected endpoint media device 116 in the local network, allowing the authorized user in another location to "drop in" and listen to and/or view content of the data stream in real-time or near-real-time as long as needed.

The security operations 282 may include recording content 282-4 as a function of detecting a composite corresponding to a trigger event. The recording may include a full recording of the corresponding content or a partial recording of the corresponding content. For example, a partial recording may correspond to a visual-only screen recording, an audio-only recording, an audio transcript, records of chat messages, screenshots of the corresponding content, and/or the like. The recording may include content presented on the endpoint media device 116 when the composite was detected, a portion of content presented before that, and a portion after that. In some embodiments, the recording may include the entire presentation session (e.g., game session, chat session, webpage presentation, etc.). The control engine 115 may cache, buffer, and/or otherwise store the presentation content (e.g., in cache or storage repositories 208) to facilitate the content recording, live streaming, content compilation, content editing/modifying, and/or the like features disclosed herein.

The security operations 282 may include providing notifications 282-5 automatically as a function of detecting a composite corresponding to a trigger event. In some embodiments, the provisioning of content may include providing a notification to an endpoint media device 116 corresponding to an authorized user, the notification 282-4 (e.g., push notifications, modal window, pop-up, email, text message, SMS message, iMessage, and/or the like) may indicate options to access the content corresponding to the detected composite. In some examples, a push notification 282-4 may be sent to a mobile app of the endpoint media device 116 of the authorized user to cause a pop-up notification 282-4 on the endpoint media device 116. Consequent to selection of the notification 282-4, access to the corresponding content may be granted. In various embodiments, selectable interface options may be presented to allow the authorized user to access a full recording of the corresponding content, a partial recording of the corresponding content (e.g., visual-only screen recording, audio-only recording, audio transcript, records of chat messages, screenshots of the corresponding content, and/or the like), streaming live audio, video, and/or text to the device 116 of the authorized user and/or another endpoint media device 116 selected by the authorized user (e.g., selected and specified via one or more interface options of the mobile app), and/or the like.

Upon selection of one or more the interface options, access to the recording and/or the live stream may be granted to the endpoint media device 116 of the authorized user. Thus, for example, the recording may be transmitted from the control engine 115, the monitoring device 151, and/or the monitoring router 110 to the endpoint media device 116 of the authorized user. Additionally or alternatively, the control engine 115, the monitoring device 151, and/or the monitoring router 110 may live stream the data stream content corresponding to the incoming data 202 to the endpoint media device 116 of the authorized user while the incoming data 202 continues to be sent to, and at least partially presented with, the endpoint media device 116 being monitored.

The security operations 282 may include presentation adjustments 282-6 where the control engine 115 automatically causes adjustments to the presentation of content by the endpoint media device 116 being monitored as a function of detecting a composite corresponding to a trigger event. The presentation adjustments 282-6 may include one or a combination of: turning off, terminating, and/or closing the pertinent application; closing a presentation window or frame through which is the content is being presented; pausing execution of the pertinent application; pausing a WiFi connection to the endpoint media device 116; closing or disabling a chat box/functionality; locking the endpoint media device 116 (e.g., by initiating a lock screen); muting or otherwise disabling audio; pausing content presentation to allow for parental review; and/or the like. In various embodiments, the applicable control specifications 210 and/or security profile 212 may specify the particular subset of presentation adjustments 282-6 to be executed for a given endpoint media device 116, application, user, and type of content composite detected. For example, in some instances, the control engine 115 may adjust on the offending medium (e.g., audio or chat) for a first trigger event and then execute additional presentation adjustments 282-6 responsive to one or more additional trigger events.

The security operations 282 may include content modifications 282-7 to modify a portion of the content corresponding to the detected composite. As disclosed herein, the control engine 115 may buffer and/or cache the incoming data 202, which may allow for on-the-fly, real-time or near real-time content modifications 282-7 to change portions of the data that correspond to the detected composite. The control engine 115 may identify one or more portions of the audio, video, and/or text data stream that correspond to the detected composite and that may be used by the control engine 115 as one or more transition points (e.g., boundaries, beginning, end, etc.), hooks, frames, windows, and/or the like for the content modifications 282-7. In various embodiments, the control engine 115 may identify the one or more portion by way of one or combination of pixel identification, detecting color component values, detecting color codes, detecting acoustic characteristics such as frequencies, intensities, tones, pitches, and/or the like audio metrics as distinctive markings; optical character recognition; and/or the like. In some embodiments, a processor (such as a main processor, a core processor, digital signal processor, and/or like) may define the portions of the video with respect to one or more reference frames and may perform auto-correlation of related images in the video stream to identify/define the areas in other frames of the video sequence that represent the portion to be changed. Image characteristics (e.g., color, brightness, contrast, color temperature, tint, shade, colorfulness, chroma, intensity, saturation, and/or any suitable color characteristic for a video sequence that may be measured) of the area of interest with respect to the reference frame(s) could be measured, quantified, and/or otherwise identified, and matched with measured image characteristics of the other frames to define the area to be changed in multiple frames in an image-changing sequence. Accordingly, certain embodiments may allow for handling the complexity of multiple on-screen options by differentiating particular areas in dynamic, image-changing content.

In various embodiments, the control engine 115 may analyze the metadata for the data stream to facilitate identification of the transition points, hooks, frames, windows, and/or other portions for the content modifications 282-7. In various embodiments, the audio, video, and/or text corresponding to the detected composite may be excised, blended, obscured, blurred, pixelated, cropped out, skipped, and/or otherwise altered through audio, video, and/or text editing by the control engine 115 so that the original detected composite is no longer presented with the rest of the data stream as the control engine 115 allows the modified data stream to exit buffering and be presented with the endpoint media device 116. Additionally or alternatively, in various embodiments, the audio, video, and/or text corresponding to the detected composite may be replaced, overlaid, overwritten, merged, blended, joined, and/or otherwise altered with alternative audio, video, and/or text content (e.g., audio bleeps, alternative words in textual form, alternative words in audio form, alternative words in video/image form, dead space, alternative graphics/images, alternative sounds/music, and/or the like) so that the original detected composite is no longer presented with the rest of the data stream as the control engine 115 allows the modified data stream to exit buffering and be presented with the endpoint media device 116. In various embodiments, the audio, video, and/or text corresponding to the original detected composite may be formatted, rescaled, cropped, image characteristic (e.g., color, brightness, transparency, opaqueness, contrast, etc.) adjusted, and/or otherwise prepared to facilitate the changes by the control engine 115 and subsequent presentation by the endpoint media device 116.

The security operations 282 may include crowd-based controls 282-8 that may correspond to any security operations 282 preformed based at least in part on the crowd-based features disclosed herein. Advantageously, the crowd-based controls 282-8 may allow for quick recognition and adaptation to new threats, triggers, and corresponding security measures for particular locations and user categories. For example, from the crowd-based control specifications 210, the subsystem 112 may automatically utilize a crowd-based trigger, detect a corresponding trigger event, and send one or more notifications to the endpoint media device 116 of an authorized user with interface options to accept or reject one or more security operations 282. Such a notification could, for example, indicate that "50 parents in your area dropped in for live viewing on this trigger and mostly the ones with kids 8-12 approved the content and those with younger kids turned off the content," and could cause presentation of selectable user interface options to approve the content, view live streaming of the content, terminate access to the content, and/or execute any other security operations such as those disclosed herein. If the authorized user does not respond within X amount of time, the subsystem 112 may automatically execute one or more security operations 282 in accordance with the crowd-based operations. So, for example, if the monitored user is known to the subsystem 112 to be in the 8 to 12 age range, the subsystem 112 may allow the content access to continue but may record the content for later viewing by the authorized user since the authorized user is presumably unavailable to view the content live. Likewise, if the monitored user is known to the subsystem 112 to be younger than 8, the subsystem 112 may terminate content access and provide follow-up notification to the authorized user regarding the termination. As another example, an authorized user could specify, through the user interface, control specifications 210 that indicate that the authorized user is not available and/or, when the authorized user is not available to respond (e.g., approve/disapprove), to automatically go with the crowd, i.e., monitor for crowd-based triggers (as well as any previously defined, default, or customized triggers) and execute the crowd-based security operations 282 or suitable alternative security operations 282. Such a security operations 282 may be the same security operations 282 that a majority or a plurality of the geo-relevant and category-relevant crowd applies or suitable alternative security operations 282, such as muting, termination, and recording instead of live viewing, or alternative security operations 282 specified by the authorized user).

With subsystem 112 determinations and security operations 282 disclosed herein, such determinations and security operations 282 may be automatically effected herein, the subsystem 112 may employ ongoing learning processes that process feedback consequent to execution of the security operations 282. When one or more security operations 282 are corrected by an authorized/controlling user either explicitly via particularized control input 204 or implicitly (e.g., by ignoring or rejecting security notifications, accepting or rejecting proposed security operations 282, etc. via selectable options of the user interface of an endpoint media device 116 of an authorized user), the matching engine 338 may adapt to the feedback. Accordingly, the subsystem 112 may learn acceptable triggers and security operations 282 via subsequent adjustments and adapt the control specifications 210, security protocols 212, profiles, rules 220, and/or pattern data 222 and automatic security operations 282 based at least in part on the learning. The control specifications 210, security protocols 212, profiles, rules 220, and/or pattern data 222 may include user models/profiles that may include learned and inferred conclusions regarding particular identified users, user pattern data 222 adapted and tuned to particular users and corresponding situations with the feedback data (e.g., parental approval or rejection of security operations 282 and/or corresponding flagged content). The matching engine 113 may facilitate machine learning or, more specifically, deep learning, to facilitate creation, development, and/or use of user pattern data 222 in order to adapt and tune control specifications 210, security protocols 212, profiles, and/or rules 220 to particular users and households.

As disclosed herein, various embodiments of the security protocols 212 may employ a protocol order, such as a decision tree, checklist, workflow, and/or the like. In various embodiments, different security operations 282 may be executed based on the certainty of the identification of a trigger event and/or user. For example, in the cases of a possible or weak identification of potentially concerning event (e.g., potentially offensive content, potential new user/stranger, potential user mismatch, etc.), the subsystem 112 may present one or more options to the authorized user to elicit user confirmation or rejection of the trigger event and/or proposed one or more security operations 282. In the case of a positive identification, the subsystem 112 may proceed with one or more security operations 282 without confirmation and may send such notifications with options to confirm or override the one or more security operations 282 and confirm or reject the event recognized as a trigger. Accordingly, the subsystem 112 may employ a gradated scale of identification/certitude and corresponding security operations 282 taken. Additionally or alternatively, in various embodiments, the subsystem 112 may employ a gradated scale of the gravity of the recognized trigger event and corresponding security operations 282 taken. For example, for relatively less grave triggers, the security operations 282 automatically selected and employed by the subsystem 112 may be minimal (e.g., notifications such as "Your child was in a video chat with 5 new people today that he hasn't talked to before" with options to approve/disapprove, tracking and logging, audio and/or video scrapes, recordings if certain types of offensiveness are involved, etc.). For more grave triggers, the security operations 282 automatically selected and employed by the subsystem 112 may involve a greater extent of interventions (e.g., censoring/bleeping, other content modifications, live casting to an endpoint media device 116, options to terminate the application/session/connection remotely, etc.).

Figure 3:
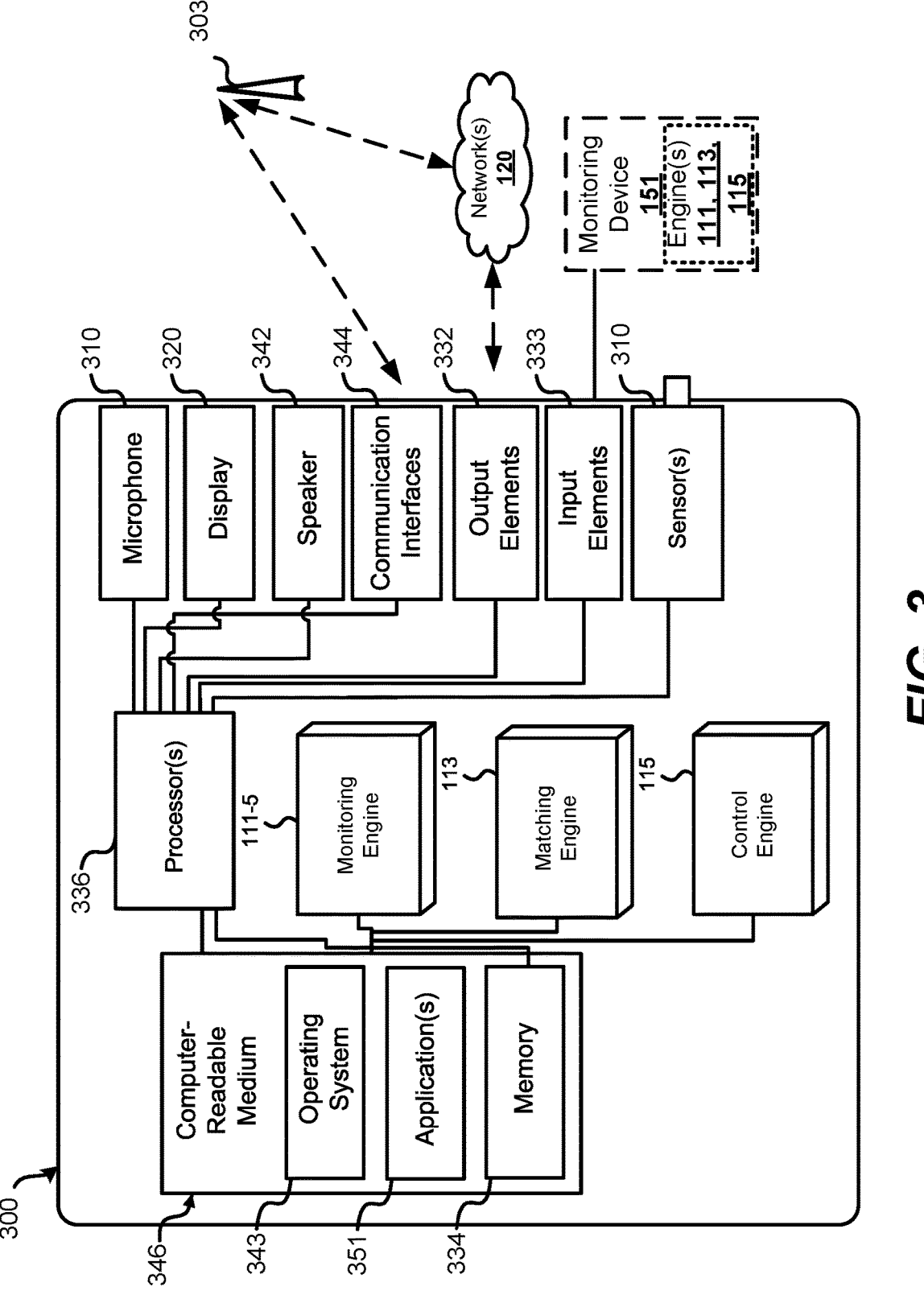
FIG. 3 illustrates a block diagram of a security and control device configured with a monitoring engine and/or monitoring device, in accordance with disclosed embodiments according to the present disclosure.

FIG. 3 is a block diagram of a security and control device 300 configured with a monitoring engine 111 and/or monitoring device 151, in accordance with disclosed embodiments according to the present disclosure. In various embodiments, the security and control device 300 may correspond to an endpoint media device 116 and/or a monitoring router 110. Thus, in some embodiments, the security and control device 300 may be a portable device configured to have the functionality of the monitoring router 110 and/or a modem in whole or in part to communicate with the systems 102, 103 in accordance with embodiments described herein.

The device 300 may include at least one computer-readable medium 346 coupled to one or more processors 336 (e.g., main processor, a core processor, digital signal processor, microprocessor, and/or the like), which stores application programs and other computer code instructions for operating the device, such as an operating system (OS) 348. In some embodiments, one or more applications 351 may be stored in the memory 334 and/or computer-readable media 346. In some embodiments, the device 300 may be provided with an application 351, which may, in some embodiments, correspond to a mobile application configured to run on the device 300 to facilitate various embodiments of this disclosure, such as the user interface of the authorized users, the monitoring engine 111, and/or the monitoring device 151. In various embodiments, the device 300 configured with the application 351 may provide one or more display screens that may each include one or more user interface elements. A user interface may include any text, image, and/or device that can be displayed on a display screen for providing information to a user and/or for receiving user input. A user interface may include one or more widgets, text, text boxes, text fields, tables, grids, charts, hyperlinks, buttons, lists, combo boxes, checkboxes, radio buttons, and/or the like. As shown in FIG. 3, the device 300 may include a display 320 and/or other output elements 332.

Input elements 333 may allow a user to input information into the device 300. By way of example without limitation, the input elements 333 may include one or more of a keypad, a trackball, a touchscreen, a touchpad, a pointing device, a microphone, a voice recognition device, or any other appropriate mechanism for the user to provide input. The user selection of a user-selectable option corresponding to the application 351 may involve any one or combination of various user inputs. The user selection may be in the form of a keyboard/keypad input, a touch pad input, a track ball input, a mouse input, a voice command, etc. For example, the content object may be selected by the user by pointing and clicking on a content object. As another example, a content object may be selected by an appropriate tap or movement applied to a touch screen or pad of the device 300. The device 300 may also include a microphone 310 to allow a user to transmit voice communication through the device 300, and a speaker 342 to allow the user to hear voice communication. The device 300 may include one or more sensors 310 that may, for example, include one or a combination of cameras, proximity sensors, motion detectors, light sensors, infrared sensors, vibrational detectors, microphones, other audio sensors, temperature sensors, humidity sensors, barometric sensors, RFID detectors, reed switches, and/or the like.

The device 300 includes a memory 334 communicatively coupled to a processor 336 (e.g., a microprocessor) for processing the functions of the device 300. The device 300 may include at least one antenna for wireless data transfer to communicate through a cellular network, a wireless provider network, and/or a mobile operator network, such as GSM, for example without limitation, to send and receive Short Message Service (SMS) messages or Unstructured Supplementary Service Data (USSD) messages. The antenna may include a cellular antenna (e.g., for sending and receiving cellular voice and data communication, such as through a network such as a 3G, 4G, or 5G network). In addition, the device 300 may include one or more interfaces in addition to the antenna, e.g., a wireless interface coupled to an antenna.

The communications interfaces 344 can provide a near field communication interface (e.g., contactless interface, Bluetooth, optical interface, infrared interface, etc.) and/or wireless communications interfaces capable of communicating through a cellular network, such as GSM, or through Wi-Fi, such as with a wireless local area network (WLAN). The communications interfaces 344 can provide local network interfaces (e.g., Ethernet, HDMI, cable, etc.) and internet interfaces (e.g., cable, fiber optic, wireless, etc.). Accordingly, the device 300 may be capable of transmitting and receiving information wirelessly through both short range, radio frequency (RF), cellular, and Wi-Fi connections; and/or transmitting and receiving information though wired connections. The device 300 may access the network 120 through a wireless and/or wired link to one or more access points 303 of any suitable type or types. For example, an access point 303 may be a cellular base station, an access point for wireless local area network (e.g., a Wi-Fi access point), an access point for wireless personal area network (e.g., a Bluetooth access point), etc. The access point 303 may connect the device 300 to the network 120, which may include the Internet, an intranet, a local area network, private communication networks, etc. In some embodiments, the communications interfaces 344 may allow device 300 to receive content cast from another device and/or transmit content, casting to another device 116. For example, the content may be indirectly transmitted via a local network (e.g., via Wi-Fi) or directly transmitted via a casting device integrated with the device or coupled to the device (e.g., via a dongle, which may correspond to the monitoring device 151 in some embodiments). As another example, the device 300 may cast content to the other device 116 via a wired connection (e.g., via one or more of Ethernet, HDMI, USB, lightning connector, etc.). Some embodiments may provide for simulcasting such that the same content that is being displayed on two or more devices (which may include one or more devices 300) simultaneously or substantially simultaneously.

One or more of the engines 111, 113, and/or 115 and/or corresponding modules may be provided to implement at least some of the monitoring, matching, and/or control functionalities of the subsystem 112 disclosed herein. In some embodiments, the mobile application 351 may transform the device 300 to configure the device to provide one or a combination of the functionalities of the subsystem 112 disclosed herein. The one or more processors 336 may handle communications transceived via communications interfaces 344, including communications related to the monitoring, matching, and/or control functionalities. The one or more processors 336 may handle incoming data from the communications interfaces 344. One or a combination of the various aspects, specifications, data, data structures, and/or the like (at least some of which may correspond to that which is stored in the storage 208) created, used, and/or developed in accordance with the embodiments disclosed herein also be stored in the computer-readable medium 346.

In various embodiments, the application 351 can be any suitable computer program that can be installed and run on the device 300, and, in some embodiments, the application 351 may not be a mobile app but may be another type of application, set of applications, and/or other executable code configured to facilitate embodiments disclosed herein. The application 351 may be provided in any suitable way. For non-limiting example, the application 351 may be made available from a website, an application store, the service provider 102, etc. for download to the device 300; alternatively, it may be pre-installed on the device 300.

Again, the example of device 300 is non-limiting. Other devices, such as those disclosed herein, may be used. It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Figure 4:
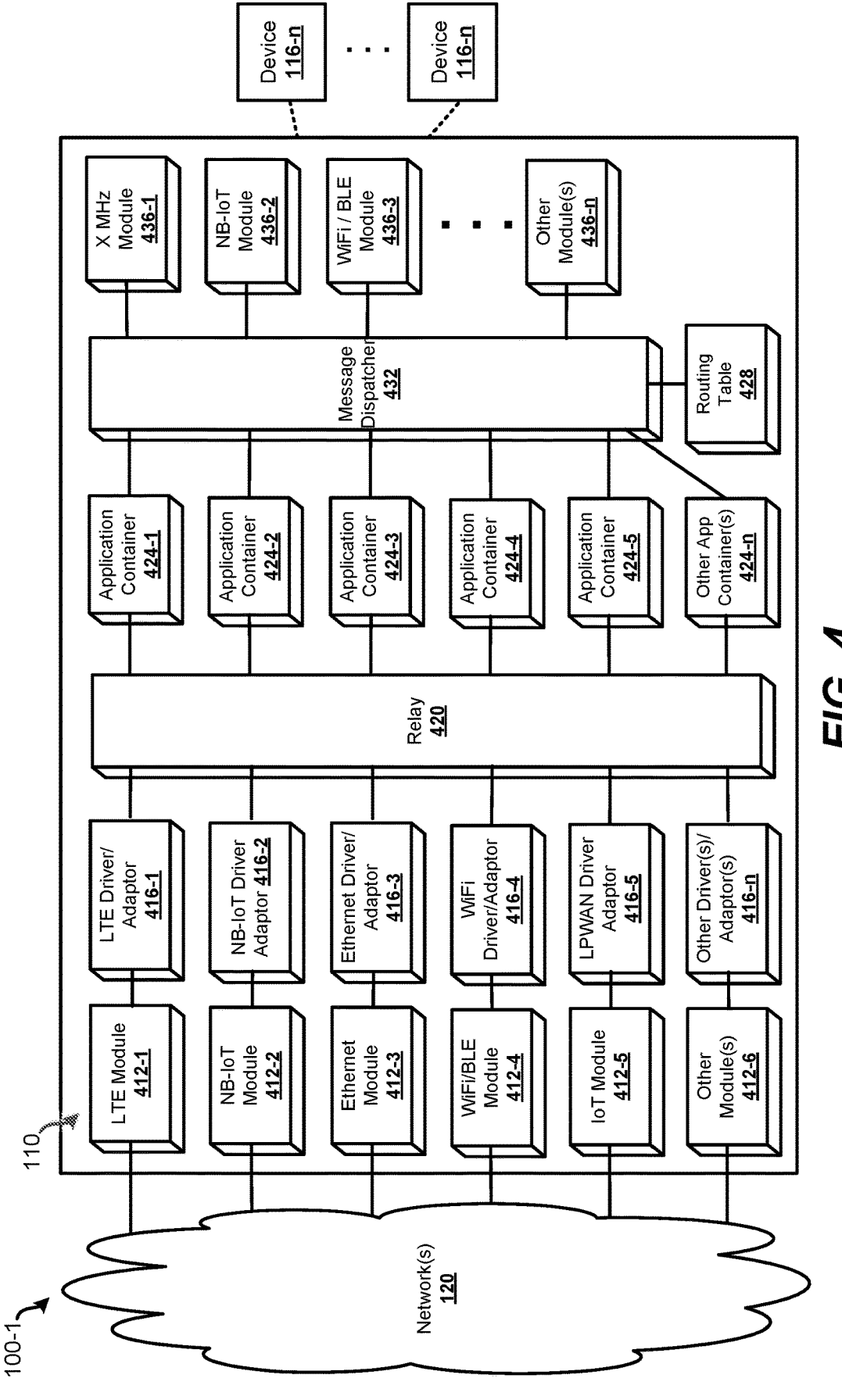
FIG. 4 illustrates certain aspects of a monitoring router, in accordance with disclosed embodiments according to the present disclosure.

FIG. 4 illustrates certain aspects of a monitoring router 110, in accordance with some embodiments according to the present disclosure. In some embodiments, the monitoring router 110 may include a Layer 3 network gateway device. In some embodiments, the monitoring router 110 may provide a bridge from one or more endpoint media devices 116 to a 5G wireless network of the networks 120. The monitoring router 110 may include any suitable routers, switches, modems, wireless transceivers, wired ports, etc., one or more processors, and input-output (I/O) interfaces, and one or more types of memory, with an operating system and instructions stored in non-transitory memory such that the monitoring router 110 may be configured to function as a special-purpose computer to provide the intelligent monitoring and control features in accordance with various embodiments disclosed herein (e.g., one or a combination of the monitoring, matching, and/or control functionalities of the subsystem 112, including one or a combination of the functionalities of the engines 111, 113, and/or 115 and/or corresponding modules). The monitoring router 110 may differentiate and indicate different types of traffic, and intelligently route traffic suitable for a next-generation network (e.g., 5G wireless network and beyond), as well as other traffic.

The monitoring router 110 may be configured to communicate with a plurality of endpoint media devices 116, identify received transmissions from the endpoint media devices 116 in particular types of protocols, and then route the different types of packets differently, with prioritization and different network slicing based at least in part on one or a combination of types of endpoint media devices 116, sensor data, network technologies, and/or packet types. In various embodiments, the monitoring router 110 may be configured to receive a multiplicity of transmissions according to a multiplicity of communications protocols that may corresponding to one or a combination of any suitable radio frequency communications, Wi-Fi, Bluetooth (BLE), LTE, 5G, 4G, communications per the NBIOT standard, next-generation wireless networks such as video per the ATSC 3.0 standard, and/or the like. In various embodiments, the monitoring router 110 may be configured with a variety of different modules 412, 436 to manage a variety of different networks of endpoint media devices 116 and/or may self-configure by downloading different modules 412, 436 and/or applications 424 responsive to detecting a particular sensor device 116 and determining the corresponding sensor type and module 412, 436 and/or application 424 needed for communication with the particular endpoint media device 116. Accordingly, the monitoring router 110 may be configured to include communication interface modules 436. The communication interface modules 436 may, for example, include radio modules that plug into slots within the monitoring router 110 and host a local-area-network (LAN) over an RF interface. The monitoring router 110 may include one or more relays 420, drivers/adaptors 416, and modules 412 that facilitate transfer of data from applications 424 to the system controller 108 and vice versa. The drivers/adaptors 416 may include the software necessary to operate the different interfaces and corresponding modules 412 specifically configured for the particular network connections (e.g., LTE, 5G, 4G, NBIOT, Ethernet, WiFi, LPWAN, and/or the like).

The communications interfaces corresponding to the communication interface modules 436 and/or 412 may, for example, be capable of transmitting and receiving information wirelessly through both short range, radio frequency (RF), cellular, Wi-Fi, and/or the like connections. The communications interfaces may, for example, provide a near field communication interface (e.g., Bluetooth, optical interface, infrared interface, etc.) and/or wireless communications interfaces capable of communicating through a cellular network, Wi-Fi, and/or the like. In various embodiments, the communications interfaces may correspond to a modem, a network card (wireless or wired), an infrared communication device, a wireless communication device, and/or a chipset (such as a Bluetooth™ device, an 802.11 device, a Wi-Fi device, a WiMAX device, cellular communication device, etc.), and/or the like in the monitoring router 110.

The communication interface(s) corresponding to the communication interface module(s) 436 and/or 412 may include at least one antenna for wireless data transfer according to the communications protocol(s). For example, the antenna may include a cellular antenna (e.g., for sending and receiving cellular data communication, such as through a network such as a 4G, or 5G network).

The application layer communications of the monitoring router 110 may support a command/response protocol, where commands are messages that instruct a device or application to take some action (which may correspond to one or more security operations 282), and responses are messages that return the result of the command message. These messages may begin with a command byte and may be followed by one or more bytes of data. The monitoring router 110 may include a message dispatcher 432 configured to manage traffic to and from the different endpoint media devices 116. The message dispatcher 432 and the modules 436 may be communicatively connected by way of one or more serial communication links. The message dispatcher 432 may, for example, manage communications between the modules 436 and applications 424. The different applications 424 that reside on the monitoring router 110 may consume data generated by corresponding endpoint media devices 116. The message dispatcher 432 may interconnect the various applications 424 to the various modules 436. While in some embodiments the various components (e.g., modules 412, modules 436, drivers and adaptors 416, relay 420, applications 424, message dispatcher 432, etc.) may be separate and distinct as illustrated, one or more of the components may be integrated in various embodiments. The message dispatcher 432 may direct traffic and route communications between the applications 424 and modules 436.

Over the lifecycle of the monitoring router 110, a routing table 428 may be populated as devices are connected. When a user interface is exposed to endpoints to add one or more endpoint media devices 116, the monitoring router 110 may add identification, specification, and authorization information for those endpoint media devices 116 to the routing table 428 so the message dispatcher 432 may subsequently understand that a particular application 424 is authorized to communicate with an endpoint media device 116 connected to a particular module 436 and the routing table 428 may provide the routing for the communications. For example, after an entry is added in the routing table 428 to define a route from a particular endpoint media device 116 and/or module 436 to a particular application 424 (and vice versa), the message dispatcher 432 may use the routing table 428 to identify a received message target.

In some embodiments, each module 436 may maintain a list with assigned slot numbers and unique IDs of the endpoint media devices 116 with which the module 436 communicates. Every time the endpoint media device 116 communicates, the module 436 may use the list to authenticate the communication. The module 436 may determine whether it recognizes the endpoint media device 116 sending the communication and whether the endpoint media device 116 is communicating within a correct time slot to which the endpoint media device 116 is assigned. Once the communication is authenticated, the module 436 may pass the communication to the application 424 that is to consume the data from the endpoint media device 116. In alternative embodiments, the message dispatcher 432 may maintain a whitelist (e.g., in the routing table 428) for all the endpoint media devices 116 and may perform the communication authentications.

Figure 5:
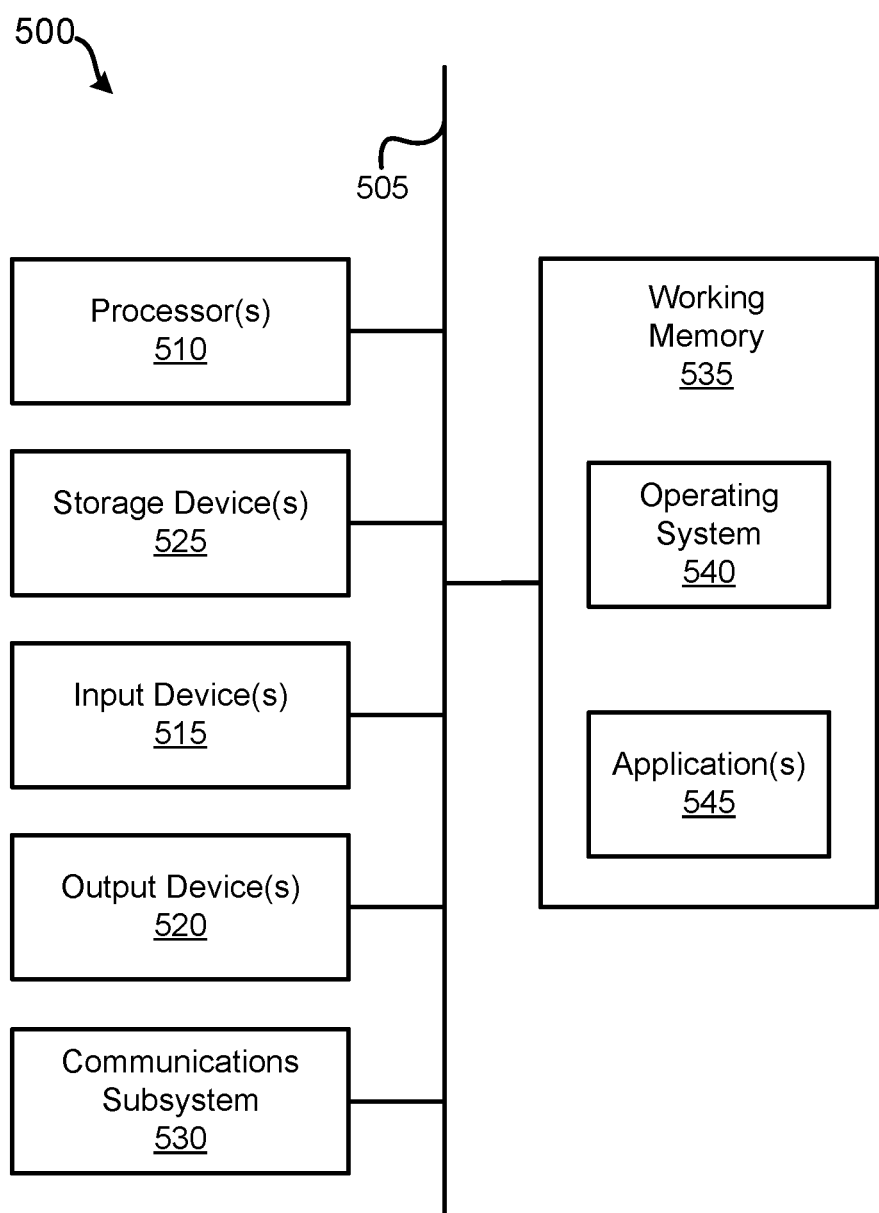
FIG. 5 illustrates a computer system, in accordance with disclosed embodiments according to the present disclosure.

A computer system as illustrated in FIG. 5 may be at least partially incorporated as part of one or a combination of the previously described computerized devices, such as a devices 110, 116, and/or 151, and/or service provider system 102. FIG. 5 provides a schematic illustration of one embodiment of a computer system 500 that can perform various steps of the methods provided by various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include one or more processors 510, including without limitation one or more general-purpose processors and/or one or more special-purpose processors (such as digital signal processing chips, graphics acceleration processors, video decoders, and/or the like); one or more input devices 515, which can include without limitation a mouse, a keyboard, remote control, and/or the like; and one or more output devices 520, which can include without limitation a display device, a printer, and/or the like.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infrared communication device, a wireless communication device, and/or a chipset (such as a Bluetooth™ device, an 802.11 device, a Wi-Fi device, a WiMAX device, cellular communication device, etc.), and/or the like. The communications subsystem 530 may permit data to be exchanged with a network (such as the network described below, to name one example), other computer systems, and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure, and/or adapt a general-purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.), then takes the form of executable code.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the non-transitory storage device(s) 525. Merely by way of example, execution of the sequences of instructions contained in the working memory 535 might cause the processor(s) 510 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 525. Volatile media include, without limitation, dynamic memory, such as the working memory 535.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 530 (and/or components thereof) generally will receive signals, and the bus 505 then might carry the signals (and/or the data, instructions, etc. carried by the signals) to the working memory 535, from which the processor(s) 510 retrieves and executes the instructions. The instructions received by the working memory 535 may optionally be stored on a non-transitory storage device 525 either before or after execution by the processor(s) 510.

It should further be understood that the components of computer system 500 can be distributed across a network. For example, some processing may be performed in one location using a first processor while other processing may be performed by another processor remote from the first processor. Other components of computer system 500 may be similarly distributed. As such, computer system 500 may be interpreted as a distributed computing system that performs processing in multiple locations. In some instances, computer system 500 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A media device to facilitate endpoint media device controls, the media device comprising:

one or more processing devices; and memory communicatively coupled with and readable by the one or more processing devices and having stored therein processor-readable instructions which, when executed by the one or more processing devices, cause the one or more processing devices to perform operations comprising:

processing one or more data streams as each data stream of the one or more data streams is received by one or more devices of a local network, the one or more data streams facilitating presentation of audio and/or video with at least one of the one or more devices of the local network that corresponds to an endpoint media device, where the one or more data streams are transmitted by a source that is external to the local network and where each data stream of the one or more data streams comprises a plurality of data elements;

for at least one data stream of the one or more data streams:

detecting that a parental control protocol applies to the at least one data stream based at least in part on one or more of the source of the at least one data stream, the endpoint media device, an identification of a user of the endpoint media device, and/or a time corresponding to when the at least one data stream is being received;

determining, during streaming of the at least one data stream, whether the at least one data stream includes a particular composite specified by the parental control protocol; and when it is determined that the at least one data stream includes the particular composite, performing one or more parental control operations in accordance with the parental control protocol;

wherein the one or more parental control operations comprise reporting the determination that the at least one data stream includes the particular composite to a second media device associated with an authorized user and mirroring a portion of the audio and/or the video corresponding to the particular composite so that the portion is accessible via the second media device.

2. The media device to facilitate endpoint media device controls as recited in claim 1, where the determining, during the streaming of the at least one data stream, whether the at least one data stream includes the particular composite specified by the parental control protocol is based at least in part on performing speech recognition with respect to at least a portion of the at least one data stream.

3. The media device to facilitate endpoint media device controls as recited in claim 1, where the determining, during the streaming of the at least one data stream, whether the at least one data stream includes the particular composite specified by the parental control protocol is based at least in part on image recognition with respect to at least a portion of the at least one data stream.

4. The media device to facilitate endpoint media device controls as recited in claim 1, where the determining, during the streaming of the at least one data stream, whether the at least one data stream includes the particular composite specified by the parental control protocol is based at least in part on text recognition with respect to at least a portion of the at least one data stream.

5. The media device to facilitate endpoint media device controls as recited in claim 1, where the determining, during the streaming of the at least one data stream, whether the at least one data stream includes the particular composite specified by the parental control protocol is based at least in part on pattern recognition with respect to one or more users and/or interactions associated with the at least one data stream.

6. The media device to facilitate endpoint media device controls as recited in claim 1, where the determining, during streaming of the at least one data stream, whether the at least one data stream includes the particular composite specified by the parental control protocol comprises determining, during streaming of the at least one data stream, whether the particular composite includes a value associated with the particular composite that is consistent with one or more values specified in the parental control protocol, and the operations further comprise:

when it is determined that the particular composite includes the value associated with the particular composite that is consistent with the one or more values, caching information associated with the particular composite, wherein the information associated with the particular composite comprises the value associated with the particular composite included in the particular composite.

7. The media device to facilitate endpoint media device controls as recited in claim 1, wherein the portion comprises the audio and the video, and the one or more parental control operations further comprise recording the portion that is presented on the endpoint media device and sending the recorded portion to a third media device associated with a second authorized user to facilitate presentation of the recorded portion with the third media device.

8. One or more non-transitory, machine-readable media having machine-readable instructions thereon which, when executed by one or more processing devices, cause a system to perform operations comprising:

processing one or more data streams as each data stream of the one or more data streams is received by one or more devices of a local network, the one or more data streams facilitating presentation of audio and/or video with at least one of the one or more devices of the local network that corresponds to an endpoint media device, where the one or more data streams are transmitted by a source that is external to the local network and where each data stream of the one or more data streams comprises a plurality of data elements;

for at least one data stream of the one or more data streams:

detecting that a parental control protocol applies to the at least one data stream based at least in part on one or more of the source of the at least one data stream, the endpoint media device, an identification of a user of the endpoint media device, and/or a time corresponding to when the at least one data stream is being received;

determining, during streaming of the at least one data stream, whether the at least one data stream includes a particular composite specified by the parental control protocol; and when it is determined that the at least one data stream includes the particular composite, performing one or more parental control operations in accordance with the parental control protocol;

wherein the one or more parental control operations comprise reporting the determination that the at least one data stream includes the particular composite to a second media device associated with an authorized user and mirroring a portion of the audio and/or the video corresponding to the particular composite so that the portion is accessible via the second media device.

9. The one or more non-transitory, machine-readable media as recited in claim 8, where the determining, during the streaming of the at least one data stream, whether the at least one data stream includes the particular composite specified by the parental control protocol is based at least in part on performing speech recognition with respect to at least a portion of the at least one data stream.

10. The one or more non-transitory, machine-readable media as recited in claim 8, where the determining, during the streaming of the at least one data stream, whether the at least one data stream includes the particular composite specified by the parental control protocol is based at least in part on image recognition with respect to at least a portion of the at least one data stream.

11. The one or more non-transitory, machine-readable media as recited in claim 8, where the determining, during the streaming of the at least one data stream, whether the at least one data stream includes the particular composite specified by the parental control protocol is based at least in part on text recognition with respect to at least a portion of the at least one data stream.

12. The one or more non-transitory, machine-readable media as recited in claim 8, where the determining, during the streaming of the at least one data stream, whether the at least one data stream includes the particular composite specified by the parental control protocol is based at least in part on pattern recognition with respect to one or more users and/or interactions associated with the at least one data stream.

13. The one or more non-transitory, machine-readable media as recited in claim 8, where the determining, during streaming of the at least one data stream, whether the at least one data stream includes the particular composite specified by the parental control protocol comprises determining, during streaming of the at least one data stream, whether the particular composite includes a value associated with the particular composite that is consistent with one or more values specified in the parental control protocol, and the operations further comprise:

when it is determined that the particular composite includes a value associated with the particular composite that is consistent with the one or more values, caching information associated with the particular composite, wherein the information associated with the particular composite comprises the value associated with the particular composite included in the particular composite.

14. A method to facilitate endpoint media device controls, the method comprising:

processing one or more data streams as each data stream of the one or more data streams is received by one or more devices of a local network, the one or more data streams facilitating presentation of audio and/or video with at least one of the one or more devices of the local network that corresponds to an endpoint media device, where the one or more data streams are transmitted by a source that is external to the local network and where each data stream of the one or more data streams comprises a plurality of data elements;

for at least one data stream of the one or more data streams:

detecting that a parental control protocol applies to the at least one data stream based at least in part on one or more of the source of the at least one data stream, the endpoint media device, an identification of a user of the endpoint media device, and/or a time corresponding to when the at least one data stream is being received;

determining, during streaming of the at least one data stream, whether the at least one data stream includes a particular composite specified by the parental control protocol; and when it is determined that the at least one data stream includes the particular composite, performing one or more parental control operations in accordance with the parental control protocol;

wherein the one or more parental control operations comprise reporting the determination that the at least one data stream includes the particular composite to a second media device associated with an authorized user and mirroring a portion of the audio and/or the video corresponding to the particular composite so that the portion is accessible via the second media device.

15. The method to facilitate endpoint media device controls as recited in claim 14, where the determining, during the streaming of the at least one data stream, whether the at least one data stream includes the particular composite specified by the parental control protocol is based at least in part on performing speech recognition with respect to at least a portion of the at least one data stream.

16. The method to facilitate endpoint media device controls as recited in claim 14, where the determining, during the streaming of the at least one data stream, whether the at least one data stream includes the particular composite specified by the parental control protocol is based at least in part on image recognition with respect to at least a portion of the at least one data stream.

17. The method to facilitate endpoint media device controls as recited in claim 14, where the determining, during the streaming of the at least one data stream, whether the at least one data stream includes the particular composite specified by the parental control protocol is based at least in part on text recognition with respect to at least a portion of the at least one data stream.

18. The method to facilitate endpoint media device controls as recited in claim 14, where the determining, during the streaming of the at least one data stream, whether the at least one data stream includes the particular composite specified by the parental control protocol is based at least in part on pattern recognition with respect to one or more users and/or interactions associated with the at least one data stream.

19. The method to facilitate endpoint media device controls as recited in claim 14, where the determining, during streaming of the at least one data stream, whether the at least one data stream includes the particular composite specified by the parental control protocol comprises determining, during streaming of the at least one data stream, whether the particular composite includes a value associated with the particular composite that is consistent with one or more values specified in the parental control protocol, and the method further comprises:

when it is determined that the particular composite includes a value associated with the particular composite that is consistent with the one or more values, caching information associated with the particular composite, wherein the information associated with the particular composite comprises the value associated with the particular composite included in the particular composite.

* * * * *